United States Patent
Nakamura et al.

(10) Patent No.: US 11,870,071 B2
(45) Date of Patent: Jan. 9, 2024

(54) POSITIVE ELECTRODE ACTIVE MATERIAL FOR NON-AQUEOUS ELECTROLYTE SECONDARY BATTERY AND METHOD FOR PRODUCING THE SAME, METHOD FOR EVALUATING POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: SUMITOMO METAL MINING CO., LTD., Tokyo (JP)

(72) Inventors: Takuma Nakamura, Niihama (JP); Haruki Kaneda, Niihama (JP); Yuki Koshika, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 697 days.

(21) Appl. No.: 16/967,554

(22) PCT Filed: Jan. 25, 2019

(86) PCT No.: PCT/JP2019/002550
§ 371 (c)(1),
(2) Date: Aug. 5, 2020

(87) PCT Pub. No.: WO2019/155919
PCT Pub. Date: Aug. 15, 2019

(65) Prior Publication Data
US 2021/0234163 A1    Jul. 29, 2021

(30) Foreign Application Priority Data
Feb. 6, 2018  (JP) .................. 2018-019415

(51) Int. Cl.
*H01M 4/525*  (2010.01)
*H01M 4/04*  (2006.01)
(Continued)

(52) U.S. Cl.
CPC ......... *H01M 4/525* (2013.01); *H01M 4/0471* (2013.01); *H01M 4/364* (2013.01);
(Continued)

(58) Field of Classification Search
CPC .... H01M 4/525; H01M 4/0471; H01M 4/364; H01M 4/382; H01M 4/505;
(Continued)

(56) References Cited

U.S. PATENT DOCUMENTS

2011/0315918 A1  12/2011  Kawai et al.
2015/0118564 A1  4/2015  Shimokita et al.
(Continued)

FOREIGN PATENT DOCUMENTS

JP  2002-151071 A  5/2002
JP  2011-070789 A  4/2011
(Continued)

OTHER PUBLICATIONS

Extended (Supplementary) European Search Report dated Oct. 12, 2021, issued in counterpart EP Application No. 19750867.4. (7 pages).
(Continued)

*Primary Examiner* — Cynthia K Walls
(74) *Attorney, Agent, or Firm* — WHDA, LLP

(57) ABSTRACT

A positive electrode active material for non-aqueous electrolyte secondary battery containing a lithium-nickel-manganese composite oxide formed of secondary particles with a plurality of aggregated primary particles, in which the positive electrode active material is represented by a general formula (1): $LidNi_{1-a-b-c}Mn_aM_bNbcO_{2+\alpha}$, at least a part of
(Continued)

niobium is solid-dissolved inside the primary particles, and an amount of lithium to be eluted into water when the positive electrode active material is immersed in water is 0.02% by mass or more and 0.10% by mass or less with respect to the entire positive electrode active material as determined by a neutralization titration method.

15 Claims, 5 Drawing Sheets

(51) Int. Cl.
  *H01M 4/36* (2006.01)
  *H01M 4/38* (2006.01)
  *H01M 4/505* (2010.01)
  *H01M 4/02* (2006.01)

(52) U.S. Cl.
  CPC ........... *H01M 4/382* (2013.01); *H01M 4/505* (2013.01); *H01M 2004/021* (2013.01); *H01M 2004/028* (2013.01)

(58) Field of Classification Search
  CPC ....... H01M 2004/021; H01M 2004/028; C01P 2002/52; C01P 2002/60; C01P 2004/50; C01P 2004/61; C01P 2006/80; C01G 53/50
  See application file for complete search history.

(56) References Cited

U.S. PATENT DOCUMENTS

| 2016/0293952 | A1 | 10/2016 | Kaneda et al. |
| 2019/0051929 | A1 | 2/2019 | Okada et al. |
| 2019/0165360 | A1 | 5/2019 | Saruwatari et al. |

FOREIGN PATENT DOCUMENTS

| JP | 2012-028313 A | 2/2012 |
| JP | 2013-073779 A | 4/2013 |
| JP | 2013-084395 A | 5/2013 |
| JP | 2015-122298 A | 7/2015 |
| JP | 2016-072071 A | 5/2016 |
| JP | 2017-228516 A | 12/2017 |
| WO | 2015/076323 A1 | 5/2015 |
| WO | 2017/199891 A1 | 11/2017 |

OTHER PUBLICATIONS

International Search Report dated Mar. 12, 2019, issued counterpart Application No. PCT/JP2019/002550, with English Translation. (4 pages).

International Preliminary Report on Patentability (Form PCT/IB/373) issued in counterpart International Application No. PCT/JP2019/002550 dated Aug. 11, 2020, with Form PCT/ISA/237. (9 pages).

POSITIVE ELECTRODE ACTIVE MATERIAL FOR NON-AQUEOUS ELECTROLYTE SECONDARY BATTERY AND METHOD FOR PRODUCING THE SAME, METHOD FOR EVALUATING POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

TECHNICAL FIELD

The present invention relates to a positive electrode active material for non-aqueous electrolyte secondary battery and a method for producing the same, a method for evaluating a positive electrode active material for non-aqueous electrolyte secondary battery, and a non-aqueous electrolyte secondary battery.

BACKGROUND ART

In recent years, development of small-sized and lightweight secondary batteries having a high battery capacity and durability has been strongly desired in association with the widespread use of portable electronic devices such as mobile phones and notebook computers. In addition, development of high-output secondary batteries as batteries for electric tools and electric cars including hybrid cars has been strongly desired.

There are non-aqueous electrolyte secondary batteries such as lithium ion secondary batteries as secondary batteries which satisfy such requirements. Non-aqueous electrolyte secondary batteries include a negative electrode, a positive electrode, an electrolyte solution and the like, and materials capable of de-inserting and inserting lithium are used as active materials of the negative electrode and the positive electrode. Furthermore, non-aqueous electrolyte secondary batteries are required to exhibit higher thermal stability in addition to a high battery capacity and durability.

Non-aqueous electrolyte secondary batteries are currently under active research and development, and particularly non-aqueous electrolyte secondary batteries using layered or spinel type lithium-metal composite oxides as a positive electrode material can provide a high voltage of 4V-class and thus are put to practical use as a battery having a high energy density.

Currently, as positive electrode active materials of non-aqueous electrolyte secondary batteries, lithium-metal composite oxides such as lithium-cobalt composite oxide ($LiCoO_2$) that is relatively easily synthesized, lithium-nickel composite oxide ($LiNiO_2$) using nickel that is cheaper than cobalt, lithium-nickel-cobalt-manganese composite oxide ($LiNi_{1/3}Co_{1/3}Mn_{1/3}O_2$), lithium-manganese composite oxide ($LiMn_2O_4$) using manganese, and lithium-nickel-manganese composite oxide ($LiNi_{0.5}Mn_{0.5}O_2$) have been proposed.

Among the above-mentioned positive electrode active materials, lithium-nickel-cobalt-manganese composite oxide ($LiNi_{1/3}Co_{1/3}Mn_{1/3}O_2$) that exhibits excellent thermal stability and a high capacity has recently attracted attention. Lithium-nickel-cobalt-manganese composite oxide is a layered compound as lithium-cobalt composite oxide and lithium-nickel composite oxide are and contains nickel, cobalt, and manganese at the transition metal site basically at a composition ratio of 1:1:1.

Meanwhile, a technology of adding niobium to the lithium-metal composite oxides described above has been proposed for the purpose of obtaining a positive electrode exhibiting high performance (high cycle characteristics, high capacity, high output) as a non-aqueous electrolyte secondary battery.

For example, Patent Literature 1 proposes a positive electrode active material for non-aqueous secondary battery, which is formed of a composition containing at least one or more compounds that are represented by a general formula: $Li_aNi_{1-x-y-z}Co_xM_yNb_zO_b$ (where M is one or more elements selected from the group consisting of Mn, Fe and Al, $1 \leq a \leq 1.1$, $0.1 \leq x \leq 0.3$, $0 \leq y \leq 0.1$, $0.01 \leq z \leq 0.05$, and $2 \leq b \leq 2.2$) and composed of lithium, nickel, cobalt, an element M, niobium, and oxygen. According to Patent Literature 1, a positive electrode active material exhibiting high thermal stability and a large discharge capacity is supposed to be obtained since the Li—Nb—O-based compound existing in the vicinity of the surface of or inside particles exhibits high thermal stability.

Patent Literature 2 proposes a positive electrode active material containing one obtained by adding niobium to a lithium-containing transition metal composite oxide which is represented by $Li_{1+x}Ni_aMn_bCo_cO_{2+d}$ ($x+a+b+c=1$, $0.7 \leq a+b$, $0 < x \leq 0.1$, $0 \leq c/(a+b) < 0.35$, $0.7 \leq a/b \leq 2.0$, $-0.1 \leq d \leq 0.1$) and has a layered structure so that the amount of niobium is 0.05% by mass or more and 2.00% by mass or less. According to Patent Literature 2 it is possible to improve the output characteristics under various temperature conditions by using such a positive electrode active material.

Patent Literature 3 proposes a positive electrode active material for non-aqueous electrolyte secondary battery which contains a lithium-transition metal composite oxide that is composed of particles having a polycrystalline structure and obtained by a producing method including a mixing process of mixing a nickel-containing hydroxide, a lithium compound, and a niobium compound having an average particle size of 0.1 to 10 μm to obtain a lithium mixture and a firing process of firing the lithium mixture at 700° C. to 840° C. in an oxidizing atmosphere to obtain a lithium-transition metal composite oxide and has a porous structure, a specific surface area of 0.9 to 3.0 m²/g, and an alkali metal content other than lithium of 20 ppm by mass or less. This positive electrode active material is supposed to realize high thermal stability, high charge and discharge capacity, and excellent cycle characteristics.

A positive electrode of a non-aqueous electrolyte secondary battery is formed, for example, by mixing a positive electrode active material with a binder such as polyvinylidene fluoride (PVDF) and a solvent such as N-methyl-2-pyrrolidone (NMP) to form a positive electrode paste and applying the positive electrode paste to a current collector such as an aluminum foil. At this time, when lithium is released from the positive electrode active material in the positive electrode paste, lithium may react with water contained in the binder and the like to generate lithium hydroxide. The generated lithium hydroxide may react with the binder to cause gelation of the positive electrode paste. Gelation of the positive electrode paste causes poor operability and a decrease in yield. This tendency is remarkable when lithium in the positive electrode active material is in excess than the stoichiometric ratio and the proportion of nickel is high.

Several attempts have been made to suppress gelation of the positive electrode paste. For example, Patent Literature 4 proposes a positive electrode composition for non-aqueous electrolyte solution secondary battery, containing a positive electrode active material formed of a lithium-transition metal composite oxide and additive particles formed of acidic oxide particles. In this positive electrode composition, lithium hydroxide generated by the reaction between lithium and water contained in the binder preferentially reacts with the acidic oxide to suppress the reaction between the generated lithium hydroxide and the binder and to suppress gelation of the positive electrode mixture paste. The acidic oxide plays a role as a conductive material in the positive electrode, lowers resistance of the entire positive electrode, and contributes to the improvement in output characteristics of the battery.

Patent Literature 5 proposes a method for manufacturing a lithium ion secondary battery, which includes preparing a lithium-transition metal oxide containing LiOH out of the composition as a positive electrode active material; determining the molar amount P of LiOH contained in 1 g of the positive electrode active material; preparing 0.05 mol or more of tungsten oxide in terms of tungsten atoms per 1 mol of LiOH with respect to the molar amount P of LiOH; and kneading the positive electrode active material and tungsten oxide with a conductive material and a binding agent using an organic solvent to prepare a positive electrode paste.

CITATION LIST

Patent Literature

Patent Literature 1: JP 2002-151071 A
Patent Literature 2: JP 2011-070789 A
Patent Literature 3: JP 2015-122298 A
Patent Literature 4: JP 2012-028313 A
Patent Literature 5: JP 2013-084395 A

SUMMARY OF INVENTION

Technical Problem

The positive electrode active materials described in Patent Literatures 1 to 3 described above all improve the battery characteristics, but further improvement in battery characteristics is required. It is described that niobium exists as a Li—Nb—O-based compound in the vicinity of the particle surface in Patent Literature 1 and niobium is contained in at least the surface of or inside the lithium-containing transition metal in Patent Literature 2, but it is desirable that niobium is more uniformly distributed in the positive electrode active material in order to stably improve the battery characteristics.

It is described that the positive electrode active materials of Patent Literatures 4 and 5 described above can suppress an increase in viscosity of the positive electrode paste, but the effect of suppressing gelation of the positive electrode paste in the positive electrode active material containing niobium is not described. Patent Literatures 1 to 3 also do not describe the effect of suppressing gelation of the positive electrode paste by niobium.

In view of the above circumstances, it is an object of the present invention to provide a positive electrode active material that exhibits high battery characteristics and suppresses gelation of the positive electrode paste at the time of positive electrode fabrication. It is another object of the present invention to provide a method capable of easily producing such a positive electrode active material in industrial scale production at low cost. The present invention further provides a method for evaluating a positive electrode active material, by which it is possible to conveniently select a positive electrode active material that contains niobium, suppresses gelation of the positive electrode paste, and can stably provide a secondary battery having a high battery capacity.

Solution to Problem

The present inventors have conducted extensive investigations in order to solve the above problems, as a result, found out that it is possible to decrease the amount of lithium eluted from the obtained positive electrode active material by adding a specific amount of niobium to lithium-nickel-manganese composite oxide containing a specific amount of manganese, and thus to improve the battery capacity and suppress gelation of the positive electrode paste at the same time, and completed the present invention.

A first aspect of the present invention provides a positive electrode active material for non-aqueous electrolyte secondary battery containing a lithium-nickel-manganese composite oxide formed of secondary particles with a plurality of aggregated primary particles, in which the positive electrode active material is represented by a general formula (1): $Li_dNi_{1-a-b-c}Mn_aM_bNb_cO_{2+\alpha}$ [where M is at least one element selected from the group consisting of Co, W, Mo, V, Mg, Ca, Al, Ti, Cr, Zr and Ta, $0.05 \le a \le 0.6$, $0 \le b \le 0.6$, $0.0003 \le c \le 0.03$, $0.95 \le d \le 1.2$, $0.33 < (1-a-b-c)$, and $0 \le \alpha \le 0.4$], at least a part of niobium is solid-dissolved inside the primary particles, and an amount of lithium to be eluted into water when the positive electrode active material is immersed in water is 0.02% by mass or more and 0.10% by mass or less with respect to the entire positive electrode active material as determined by a neutralization titration method.

It is preferable that the maximum niobium concentration is 1 time or more and 3 times or less the average niobium concentration inside the primary particles. It is preferable that the positive electrode active material contains a compound containing lithium and niobium and the compound containing lithium and niobium exists on the surface of the primary particles. It is preferable that the crystallite diameter of the positive electrode active material is 110 nm or more and 200 nm or less as determined from the peak of (003) plane in the X-ray diffraction pattern by the Scherrer equation. It is preferable that the volume average particle size MV of the positive electrode active material is 5 μm or more and 20 μm or less.

A second aspect of the present invention provides a method for producing a positive electrode active material for non-aqueous electrolyte secondary battery containing a lithium-nickel-manganese composite oxide formed of secondary particles with a plurality of aggregated primary particles, the method including mixing at least either of nickel-manganese composite hydroxide particles or nickel-manganese composite oxide particles with a niobium compound and a lithium compound and firing the lithium-niobium mixture obtained by mixing, in which the nickel-manganese composite hydroxide particles and the nickel-manganese composite oxide particles contain nickel, manganese, and optionally an element M, wherein an atomic ratio of the respective metals is represented by Ni:Mn:M=(1−a−b):a:b [where $0.055 \le a \le 0.6$, $0 \le b \le 0.6$, $0.33 < (1-a-b)$, M is at least one element selected from the group consisting of Co, W, Mo, V Mg, Ca, Al, Ti, Cr, Zr and Ta], the lithium-niobium mixture contains niobium at 0.03 atomic % or more and 3 atomic % or less with respect to entire metal elements other than lithium, and the positive electrode active material is adjusted so that at least a part of niobium is solid-dissolved inside the primary particles and an amount of lithium to be eluted into water when the positive electrode active material is immersed in water is 0.02% by mass or more and 0.10% by mass or less with respect to entire positive electrode active material as determined by a neutralization titration method.

In the method for producing a positive electrode active material, it is preferable that the lithium-niobium mixture is fired at 850° C. or more and 1000° C. or less in an oxidizing atmosphere. It is preferable that at least a part of niobium of lithium-nickel-manganese composite oxide is solid-dissolved in the primary particles and the maximum niobium concentration inside the primary particles is 1 time or more and 3 times or less. It is preferable that firing is performed so that the crystallite diameter of the positive electrode active material is 110 nm or more and 200 nm or less as determined from the peak of (003) plane in the X-ray diffraction pattern by the Scherrer equation. It is preferable that the nickel-manganese composite hydroxide particles are obtained by performing crystallization in a reaction aqueous solution containing a salt containing nickel, a salt containing manganese, and optionally a salt containing an element M by controlling the pH of and ammonium ion concentration in the reaction aqueous solution to be in predetermined ranges, and the nickel-manganese composite oxide particles are obtained by subjecting the nickel-manganese composite hydroxide particles obtained by the crystallization to a thermal treatment. It is preferable that the niobium compound is niobium acid or niobium oxide and has an average particle size of 0.01 μm or more and 10 μm or less. It is preferable that the lithium compound is lithium carbonate. It is preferable that the nickel-manganese composite oxide particles are obtained by subjecting the nickel-manganese composite hydroxide particles to a thermal treatment at a temperature of 105° C. or more and 700° C. or less.

A third aspect of the present invention provides a method for evaluating a positive electrode active material for non-aqueous electrolyte secondary battery containing a lithium-nickel-manganese composite oxide represented by a general formula (1): $Li_dNi_{1-a-b-c}Mn_aM_bNb_cO_{2+\alpha}$ [where M is at least one element selected from the group consisting of Co, W, Mo, V, Mg, Ca, Al, Ti, Cr, Zr and Ta, $0.05 \le a \le 0.6$, $0 \le b \le 0.6$, $0.0003 \le c \le 0.03$, $0.95 \le d \le 1.2$, $0.33 < (1-a-b-c)$, and $0 \le \alpha \le 0.4$], the method including measuring an amount of lithium that is eluted into water when the positive electrode active material is immersed in water and determined by a neutralization titration method and selecting a positive electrode active material in which the amount of lithium eluted into water is 0.02% by mass or more and 0.10% by mass or less with respect to entire positive electrode active material.

A fourth aspect of the present invention provides a non-aqueous electrolyte secondary battery including a positive electrode, a negative electrode, and a non-aqueous electrolyte, in which the positive electrode contains the positive electrode active material for non-aqueous electrolyte secondary battery described above.

Advantageous Effects of Invention

The positive electrode active material of the present invention can suppress gelation of the positive electrode paste at the time of positive electrode fabrication and exhibit high battery characteristics in a secondary battery. The positive electrode active material of the present invention is easily handled at the time of positive electrode fabrication and thus the yield can be improved. By the method for producing a positive electrode active material of the present invention, it is possible to easily produce such a positive electrode active material in industrial scale production at low cost. By the method for evaluating a positive electrode active material of the present invention, it is possible to conveniently select a positive electrode active material that contains niobium, suppresses gelation of the positive electrode paste, and can provide a secondary battery having a high battery capacity.

By the method for evaluating a positive electrode active material for non-aqueous electrolyte secondary battery, it is possible to conveniently select a positive electrode active material that suppresses gelation of the positive electrode paste and has a high battery capacity.

DESCRIPTION OF EMBODIMENTS

Figure 1:
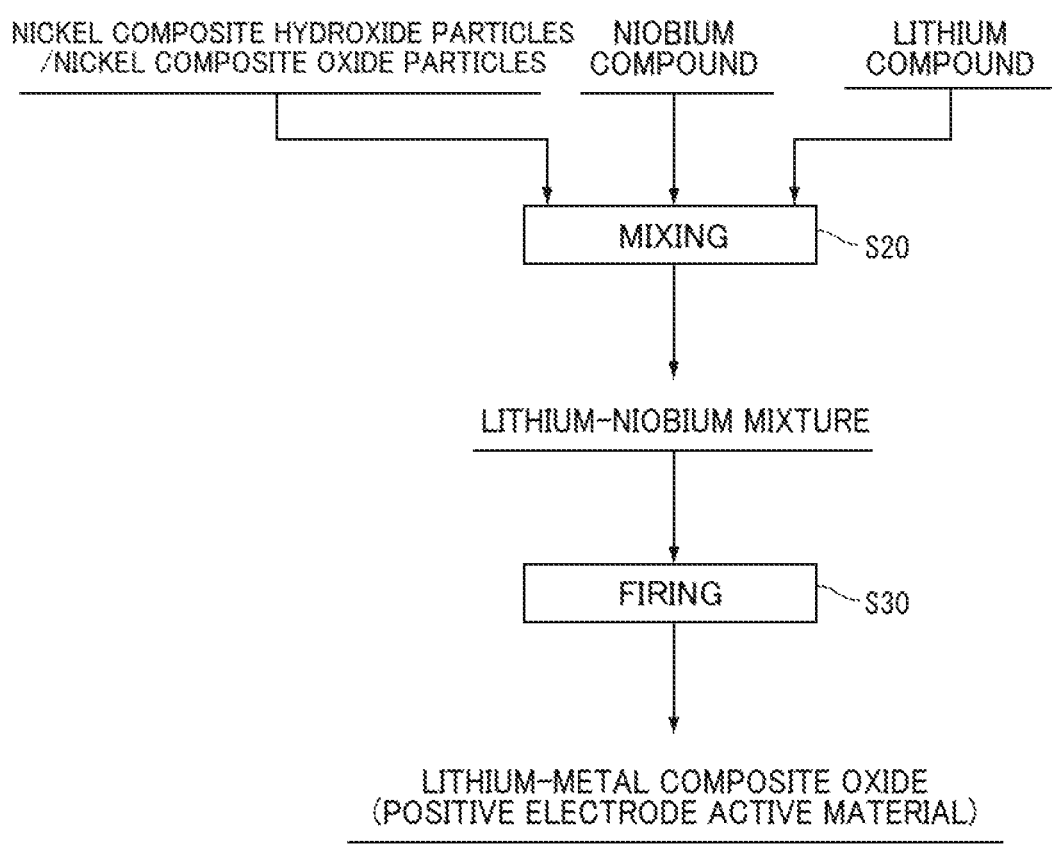
FIG. 1 is a diagram illustrating an example of a method for producing a positive electrode active material according to the present embodiment.

Hereinafter, the present embodiment of the present invention will be described with reference to the drawings. Note that in the drawings, in order to make it easy to understand each configuration, some parts are emphasized or simplified, and actual structures, shapes, scales, and the like may be different from those of the drawings.

1. Positive Electrode Active Material for Non-Aqueous Electrolyte Secondary Battery The positive electrode active material for non-aqueous electrolyte secondary battery according to the present embodiment (hereinafter, also referred to as "positive electrode active material") contains lithium-nickel-manganese composite oxide (hereinafter, also referred to as "lithium-metal composite oxide") that is composed of particles having a polycrystalline structure and formed of secondary particles with a plurality of aggregated primary particles. In the positive electrode active material, at least a part of niobium is solid-dissolved inside the primary particles and the amount of lithium to be eluted into water (hereinafter, also referred to as "eluted lithium amount") when the positive electrode active material is immersed in water is 0.02% by mass or more and 0.10% by mass or less with respect to the entire positive electrode active material as determined by a neutralization titration method.

The positive electrode active material according to the present embodiment contains specific amounts of manganese and niobium and has an eluted lithium amount controlled to be in the above range and thus can achieve both suppression of gelation of the positive electrode paste and excellent battery characteristics (high charge and discharge capacity, excellent output characteristics, thermal stability and the like) in the positive electrode of a secondary battery.

[Composition of Positive Electrode Active Material]

The positive electrode active material is represented by a general formula (1): $Li_dNi_{1-a-b-c}Mn_aM_bNb_cO_{2+\alpha}$ (where M is at least one element selected from the group consisting of Co, W, Mo, V, Mg, Ca, Al, Ti, Cr, Zr and Ta, $0.05 \le a \le 0.6$, $0 \le b \le 0.6$, $0.0003 \le c \le 0.03$, $0.95 \le d \le 1.20$, $0.33 < (1-a-b-c)$, and $0 \le \alpha \le 0.4$).

(Mn)

In the general formula (1), the range of a indicating the content of Mn is $0.05 \le a \le 0.6$, preferably $0.10 \le a \le 0.55$, more preferably $0.10 < a \le 0.50$, still more preferably $0.12 \le a \le 0.45$. When the value of a is in the above range, excellent output characteristics and a high energy density can be attained and further the thermal stability can also be enhanced. The effect of improving the thermal stability is not attained when the value of a is less than 0.05, and the output characteristics and energy density decrease when the value of a exceeds 0.6. It is possible to lower the positive electrode resistance and obtain a secondary battery exhibiting extremely high output characteristics by containing Mn in the above range together with Nb to be described later in the positive electrode active material of the present embodiment.

(Element M)

In the general formula (1), M is at least one element selected from the group consisting of Co, W, Mo, V, Mg, Ca, Al, Ti, Cr, Zr and Ta. The range of b indicating the content of M is $0 \le b \le 0.6$, and the thermal stability, storage characteristics, and battery characteristics can be improved when the value of b exceeds 0. For example, when M contains Co, superior battery capacity and output characteristics are attained. When M is Co, it is preferably $0.05 \le b \le 0.5$, more preferably $0.1 \le b \le 0.4$.

(Nb)

In the general formula (1), the range of c indicating the content of Nb is $0.0003 \le c \le 0.03$. When the value of c is in the above range, a high battery capacity can be attained when the positive electrode active material is used in the positive electrode of a secondary battery. By containing Nb in the above range and controlling the amount of lithium eluted from the positive electrode active material to be in a specific range to be described later, it is possible to more uniformly distribute niobium existing inside and/or on the surface of the primary particles and achieve both suppression of gelation of the positive electrode paste and excellent battery characteristics. When lithium carbonate is used as a raw material for lithium, it is possible to decrease the amount of lithium eluted from the positive electrode active material as well as decrease remaining carbon. When the value of c is less than 0.0003, the effect of decreasing the eluted lithium amount and remaining carbon is not attained. When the value of c exceeds 0.03, segregation of niobium compound is likely to occur and output characteristics and battery capacity may decrease.

The range of c is preferably $0.0005 \le c \le 0.025$, more preferably $0.001 \le c \le 0.02$ from the viewpoint of more uniformly distributing niobium and obtaining a positive electrode active material exhibiting high battery characteristics.

For example, when the value of c in the general formula (1) exceeds 0.005, it is possible not only to solid-dissolve niobium inside the primary particles but also to form a lithium-niobium compound on the surface of the primary particles by using the method for producing a positive electrode active material to be described later. However, even when the same amount of niobium is contained, the lithium-niobium compound may be excessively formed or non-uniformly formed on the surface of the primary particles by fluctuation of the conditions at the time of production. In such a case, expected battery characteristics and the effect of suppressing gelation of the positive electrode paste are not attained. It is possible to form the lithium-niobium compound on the surface of the primary particles in more suitable amount and distribution by controlling the amount of lithium eluted from the positive electrode active material to be in a proper range. Hence, when the range of c indicating the content of niobium is particularly $0.005 < c < 0.02$, it is possible to easily and stably obtain a secondary battery exhibiting superior battery characteristics by controlling the amount of lithium eluted from the positive electrode active material to be in a specific range.

(Ni)

In the general formula (1), the range of $(1-a-b-c)$ indicating the content of Ni is $0.33 < (1-a-b-c)$. Generally, as the Ni content is higher, the battery capacity (initial charge and discharge capacity) of the secondary battery obtained can be improved but gelation of the positive electrode paste tends to occur at the time of positive electrode fabrication. The positive electrode active material of the present embodiment can suppress gelation of the positive electrode paste and improve the battery characteristics by containing niobium in a specific range and controlling the eluted lithium amount to be in a specific range, for example, even when the content of nickel is $0.5 \le (1-a-b-c)$ and $0.55 \le (1-a-b-c)$ in the above general formula.

(Li)

In the general formula (1), the range of d indicating the content of Li is $0.95 \le d \le 1.2$. Usually, as the content of Li increases, gelation of the positive electrode paste when fabricating the positive electrode tends to occur. The positive electrode active material of the present embodiment can suppress gelation of the positive electrode paste while improving the battery characteristics by containing niobium in a specific range and controlling the eluted lithium amount to be in a specific range, for example, even when the content of Li is $1.0 < d \le 1.2$ in the general formula (1).

[Eluted Lithium Amount]

The present inventors have found out that it is possible to more uniformly distribute niobium existing inside and/or on the surface of the primary particles, suppress gelation of the positive electrode paste, and improve the battery characteristics by adjusting the amount of lithium eluted from the positive electrode active material to be in a specific range in the positive electrode active material containing niobium in a specific amount although the details are unknown, and thus completed the present invention.

In the positive electrode active material of the present embodiment, the eluted lithium amount is 0.02% by mass or more and 0.10% by mass or less, preferably 0.04% by mass or more and 0.08% by mass or less with respect to the entire positive electrode active material. When the eluted lithium amount is in the above range, gelation of the positive electrode paste is significantly suppressed and a secondary battery exhibiting excellent battery characteristics can be obtained. When the eluted lithium amount exceeds 0.10% by mass, a state is attained in which a large amount of excessive lithium is in the positive electrode active material and it is difficult to suppress gelation of the paste. On the other hand, when the eluted lithium amount is less than 0.02% by mass, the battery characteristics may deteriorate.

For example, when d indicating the content of lithium is more than 1 and the range of the content of nickel is $0.5 \le (1-a-b-c)$ in the general formula (1), the eluted lithium amount may be set to 0.05% by mass or more and 0.10% by mass or less. For example, when d indicating the content of lithium exceeds 1 and the range of $(1-a-b-c)$ is $0.55 \le (1-a-b-c)$, the eluted lithium amount may be set to 0.06% by mass or more and 0.10% by mass or less. When the content of nickel and the eluted lithium amount are in the above ranges, gelation of the positive electrode paste is significantly suppressed and a secondary battery exhibiting excellent battery characteristics can be obtained.

The eluted lithium amount can be determined by taking 5 g of the positive electrode active material, putting, immersing, and stirring the positive electrode active material in 100 ml of pure water at 25° C. for 30 minutes, then performing filtration, subjecting the filtrate to neutralization titration using an aqueous HCl solution, and calculating the amount of lithium eluted into the pure water (% by mass with respect to the entire amount of positive electrode active material).

The amount of lithium eluted from the positive electrode active material can be controlled to be in the above range by containing manganese and niobium in specific ranges in the production process of the positive electrode active material and adjusting the dissolved oxygen concentration in the reaction solution, the temperature of the reaction solution, and the like in the crystallization process (step S10), adjusting the firing temperature and the like in the firing process (step S30), or adding a calcination process (step S25) as described later.

The eluted lithium is considered to be derived from the residue (unreacted lithium compound) of the lithium compound used as a raw material or excessive lithium such as lithium existing in crystal of the positive electrode active material.

[Existence Form of Niobium]

The positive electrode active material according to the present embodiment contains niobium, and at least a part of niobium is solid-dissolved in the primary particles. When the positive electrode active material contains niobium, the amount of lithium eluted from the positive electrode active material can be decreased. Although the details of the reason for this are unknown, the following phenomena are presumed. In other words, niobium (usually pentavalent) is an element having a higher valence than nickel contained in the positive electrode active material, and as an element with a high valence exists at the time of positive electrode active material production, particularly in the firing process (step S30), it is less required to increase the valence of nickel as compared with a product to which niobium is not added when the precursor particles (nickel composite hydroxide particles, nickel composite oxide particles, and the like) and the lithium compound undergo a sintering reaction. It is considered that the reaction of the lithium compound easily proceeds, the remaining amount of the unreacted lithium compound decreases, and the eluted lithium amount also decreases in association with this.

Particularly when lithium carbonate is used as the lithium compound, lithium carbonate has a higher melting point than lithium hydroxide and thus tends to remain as an unreacted lithium compound after the firing process. However, in the positive electrode active material according to the present embodiment, it is considered that as niobium is contained, the reaction of lithium carbonate when firing is promoted and finally it is possible to decrease the remaining amount of unreacted lithium carbonate, the eluted lithium amount, and the content of remaining carbon as an impurity.

When at least a part of niobium is solid-dissolved in the primary particles, it is possible to attain the effect of improving the thermal stability and lowering the positive electrode resistance when the positive electrode active material is used in a secondary battery. Incidentally, the fact that niobium is solid-dissolved in the primary particles refers to, for example, a state in which niobium is detected by ICP atomic emission spectroscopy and niobium is detected in the primary particles by surface analysis of the primary particle cross section by EDX using a scanning transmission electron microscope (S-TEM), and it is preferable that niobium is detected throughout the interior of primary particles as described later.

[Niobium Concentration in Primary Particles]

In the positive electrode active material of the present embodiment, the maximum niobium concentration inside the primary particles (maximum niobium concentration/average niobium concentration) is preferably 1 time or more and 3 times or less the average niobium concentration inside the primary particles. When the maximum niobium concentration/average niobium concentration exceeds the above range, the fluctuation of the niobium concentration in the primary particles may increase and the battery characteristics and the like may decrease as a whole of the positive electrode active material.

The fluctuation of the niobium concentration in the primary particles can be confirmed by line analysis of the composition of the primary particle cross section by EDX measurement using a scanning transmission electron microscope (S-TEM). The maximum niobium concentration with respect to the average niobium concentration in the primary particles (maximum niobium concentration/average niobium concentration) can be attained, for example, by arbitrarily selecting 20 or more primary particles from a plurality of secondary particles and performing line analysis of the composition in the cross sections of the individual primary particles by EDX measurement using S-TEM. The line analysis is preferably performed in the direction in which the cross section of the primary particles is the maximum length but may be performed in a direction in which a length to be 50% or more of the maximum length can be analyzed when the influence of niobium compound to be described later is excluded and the like. The maximum niobium concentration and the average niobium concentration in the primary particles are determined from the measured values of the niobium concentrations in the individual primary particles attained by the line analysis and the ratios (maximum niobium concentration/average niobium concentration) of the maximum niobium concentrations in the individual primary particles are respectively calculated. Furthermore, the number average of the ratio values of the maximum niobium concentrations calculated from the individual primary particles is calculated, whereby the maximum niobium concentration in the primary particles can be determined. Since the fluctuation of the niobium concentration is a value in the primary particles, when the niobium compound on the surface of the primary particles is confirmed by prior surface analysis or the like, the fluctuation of the niobium concentration is measured through line analysis by EDX at a position at which the measured value of niobium concentration in the vicinity of the surface of the primary particles is not affected by the existence of niobium compound.

In order to attain a higher effect, it is preferable to suppress the presence of a portion at which the niobium concentration is extremely low in the primary particles and it is preferable that the minimum niobium concentration in the primary particles is 50% or more of the average niobium concentration in the primary particles. The minimum niobium concentration can be attained by arbitrarily selecting 20 or more primary particles from a plurality of secondary particles and performing line analysis of the composition in the cross sections of the individual primary particles by EDX measurement using S-TEM as in the above and can be determined by calculating the number average of the values of [(minimum niobium concentration/average niobium concentration)×100](%) calculated from a plurality of primary particles.

[Lithium-Niobium Compound]

In the positive electrode active material according to the present embodiment, it is preferable that niobium is solid-dissolved inside the primary particles as described above and a compound containing lithium and niobium (hereinafter, also referred to as "lithium-niobium compound") exists on the surface of the primary particles.

The lithium-niobium compound is considered to have a high lithium ion conductivity and an effect of promoting the movement of lithium ions, and the lithium-niobium compound formed on the primary particle surface can form a Li conduction path at the interface between the electrolyte solution and the primary particles. This is considered to lower the positive electrode resistance of the secondary battery obtained and improve the output characteristics.

The lithium-niobium compound is not particularly limited but is preferably at least one selected from the group consisting of $LiNbO_3$, $LiNb_3O_8$, and $Li_3NbO_4$, more preferably $Li_3NbO_4$.

The lithium-niobium compound is not required to coat the entire surface of the primary particles of lithium-metal composite oxide, and the effect of lowering the positive electrode resistance can be attained if the lithium-niobium compound exists at least on a part of the surface of the primary particles. The lithium-niobium compound is preferably fixed to the surface of the primary particles of lithium-metal composite oxide.

The surface of the primary particle in the present specification includes the surface of the primary particle exposed to the outer surface of the secondary particle and the surface of the primary particle exposed to the voids, which communicate with the outside of the secondary particle and through which the electrolyte solution can penetrate, in the vicinity of the surface of and inside the secondary particle. Even the grain boundary between the primary particles is included as long as it is in a state in which the binding of the primary particles is incomplete and the electrolyte solution can penetrate.

The lithium-niobium compound existing on the surface of the primary particles is formed by the reaction of the niobium compound used as the niobium raw material with the lithium compound used as the lithium raw material in the firing process (step S30) to be described later. It is presumed that the reaction to form the lithium-niobium compound also contributes to a decrease in the eluted lithium amount. As described above, when lithium carbonate is used as the lithium compound, the content of remaining carbon can be further decreased.

The lithium-niobium compound may exist in the coexisting state of crystal and amorphous or in the amorphous state. When the lithium-niobium compound exists in a crystalline state, the existence thereof can be confirmed by X-ray diffraction (XRD) measurement as well as an increase in the abundance.

The lithium-niobium compound requires a reaction with the lithium compound in the formation process even when taking any existence form, thus it is presumed that the reaction when firing is relatively promoted as compared with the positive electrode active material to which niobium is not added, and the effect of decreasing the amount of lithium eluted from the positive electrode active material is attained as the lithium-niobium compound exists at least on a part of the surface of the primary particles. When lithium carbonate is used as the lithium compound, the effect of decreasing remaining carbon is also attained.

The existence of lithium-niobium compound can be indirectly evaluated by measuring the amount of lithium eluted from the positive electrode active material. For example, when the eluted lithium amount is decreased by, for example, 0.03% by mass or more, preferably 0.05% by mass or more as compared with a positive electrode active material produced under the same conditions except that niobium is not added, the formation of lithium-niobium compound can be estimated.

[Crystallite Diameter of (003) Plane]

In the positive electrode active material, the crystallite diameter of (003) plane is preferably 110 nm or more and 200 nm or less, more preferably 120 nm or more and 190 nm or less, still more preferably 130 nm or more and 180 nm or less. When the crystallite diameter of (003) plane is in the above range, it is easy to adjust the amount of lithium eluted from the positive electrode active material to be in the above range. The crystallite diameter of (003) plane can be set to be in the above range by adjusting the firing temperature and the like in the firing process (step S30). The crystallite diameter of (003) plane is the crystallite diameter determined from the peak of (003) plane in the X-ray diffraction pattern by the Scherrer equation.

(Volume Average Particle Size MV)

The volume average particle size MV of the positive electrode active material is preferably 3 μm or more and 20 μm or less, more preferably 5 μm or more and 20 μm or less, still more preferably 5 μm or more and 15 μm or less. When the volume average particle size MV is in the above range, it is possible to achieve both high output characteristics and battery capacity and high filling property to the positive electrode when the positive electrode active material is used in the positive electrode of a secondary battery. High filling property to the positive electrode may not be attained when the average particle size of the positive electrode active material is less than 3 μm, and high output characteristics and battery capacity may not be attained when the average particle size exceeds 20 μm. The volume average particle size MV can be determined from, for example, a volume integrated value measured by a laser light diffraction/scattering type particle size distribution analyzer.

Figure 2:
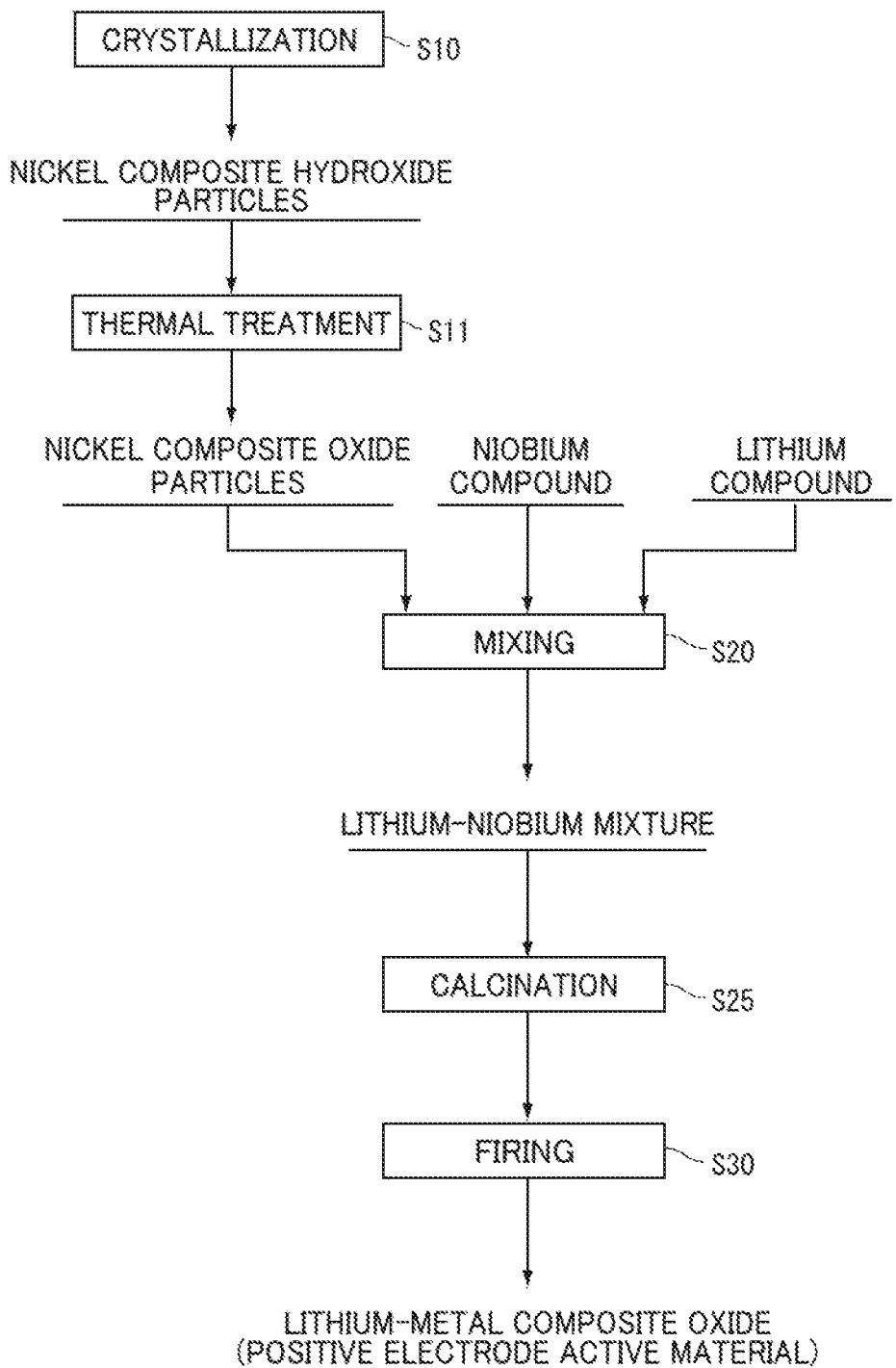
FIG. 2 is a diagram illustrating an example of a method for producing a positive electrode active material according to the present embodiment.

2. Method for Producing Positive Electrode Active Material for Non-Aqueous Electrolyte Secondary Battery FIGS. 1 and 2 are diagrams illustrating an example of a method for producing a positive electrode active material for non-aqueous electrolyte secondary battery according to the present embodiment (hereinafter, also referred to as "method for producing a positive electrode active material"). As illustrated in FIG. 1, the method for producing a positive electrode active material includes mixing (step S20) at least either (hereinafter, both are collectively referred to as "precursor particles") of nickel-manganese composite hydroxide particles (hereinafter also referred to as "nickel composite hydroxide particles") or nickel-manganese composite oxide particles (hereinafter also referred to as "nickel composite oxide particles"), a niobium compound, and a lithium compound and firing (step S30) the lithium-niobium mixture obtained by mixing. By the method for producing a positive electrode active material according to the present embodiment, it is possible to easily produce the positive electrode active material described above.

In the method for producing a positive electrode active material according to the present embodiment, it is possible to obtain a positive electrode active material in which niobium is uniformly distributed inside the primary particles and/or on the surfaces of the primary particles by adjusting the amount of lithium to be eluted into water (hereinafter, also referred to as "eluted lithium amount") when the positive electrode active material obtained is immersed in water to be a specific amount as described later. In the method for producing a positive electrode active material according to the present embodiment, it is preferable to produce the positive electrode active material by crystallizing precursor particles (step S10) as illustrated in FIG. 2 from the viewpoint of more uniformly distributing elements other than niobium inside the primary particles.

The positive electrode active material obtained by the production method according to the present embodiment contains lithium-nickel-manganese composite oxide (hereinafter, also referred to as "lithium-metal composite oxide") formed of secondary particles with a plurality of aggregated primary particles, and at least a part of niobium is solid-dissolved inside the primary particles of the lithium-metal composite oxide. This positive electrode active material is represented by, for example, a general formula (1): $Li_dNi_{1-a-b-c}Mn_aM_bNb_cO_{2+\alpha}$ (where M is at least one element selected from the group consisting of Co, W, Mo, V, Mg, Ca, Al, Ti, Cr, Zr and Ta, $0.05 \le a \le 0.6$, $0 \le b \le 0.6$, $0.0003 \le c \le 0.03$, $0.95 \le d \le 1.2$, $0.33 < (1-a-b-c)$, and $0 \le \alpha \le 0.4$). Hereinafter, an example of the respective processes used in the production method of the present embodiment will be described with reference to FIGS. 1 and 2. Note that the following description is an example of the production method and does not limit the production method.

[Crystallization Process (Step S10)]

First, nickel-manganese composite hydroxide particles are obtained by performing crystallization (step S10) in a reaction aqueous solution containing a salt containing nickel (nickel salt), a salt containing manganese (manganese salt), and optionally a salt containing an element M (element M salt) by controlling the pH of and ammonium ion concentration in the reaction aqueous solution to be in predetermined ranges.

The nickel composite hydroxide particles obtained by the crystallization process (step S10) are mainly formed of secondary particles with a plurality of aggregated primary particles, manganese is uniformly distributed in the primary particles of the lithium-metal composite oxide (positive electrode active material) finally obtained by uniformly containing manganese inside these primary particles, and the secondary battery fabricated using this positive electrode active material can attain effects such as high thermal stability and decreased conductivity. By containing manganese in the primary particles of the nickel composite hydroxide particles, it is possible to increase the firing temperature in the firing process (step S30) to be described later and to uniformly solid-dissolve niobium inside the primary particles of the lithium-metal composite oxide (positive electrode active material).

When raw materials other than the precursor particles (nickel composite hydroxide particles and/or nickel composite oxide particles) are used as a precursor of the positive electrode active material, for example, when a mixture obtained by mixing a compound containing nickel (nickel compound) such as nickel hydroxide and a compound containing manganese (manganese compound) and particles of a nickel compound coated with a manganese compound are mixed with a lithium compound and fired, manganese may be non-uniformly distributed in the positive electrode active material obtained and the above effects may not be sufficiently attained.

(Composition of Nickel Composite Hydroxide Particles)

The nickel composite hydroxide particles contain nickel, manganese, and optionally an element M, and the atomic ratio (2) of the respective elements is represented by Ni:Mn:M=(1-a-b):a:b [where $0.05 \le a \le 0.6$, $0 \le b \le 0.6$, $0.33 < (1-a-b)$, and M is at least one element selected from the group consisting of Co, W, Mo, V, Mg, Ca, Al, Ti, Cr, Zr and Ta].

The nickel composite hydroxide particles may be represented by, for example, a general formula (2): $Ni_{1-a-b}Mn_aM_b(OH)_{2+\beta}$ (where M is at least one element selected from the group consisting of Co, W, Mo, V, Mg, Ca, Al, Ti, Cr, Zr and Ta, $0.05 \le a \le 0.6$, $0 \le b \le 0.6$, $0.33 < 1-a-b$, and $0 \le \beta \le 0.4$).

The nickel composite hydroxide particles can also be produced by a method other than the crystallization process (step S10) as long as they have the element ratio of the general formula (2) (also referred to as "element ratio (2)") but are preferably obtained by the crystallization process (step S10) from the viewpoint of more uniformly distributing the metal elements contained in the positive electrode active material and easily controlling the eluted lithium amount to be in a desired range.

The crystallization process (step S10) is not particularly limited as long as it is a method by which the nickel composite hydroxide particles represented by the element ratio (2) are obtained, but the following method can be suitably used. First, an alkaline aqueous solution is added to a mixed aqueous solution containing a nickel salt, a manganese salt, and optionally an element M salt to prepare a reaction aqueous solution. Next, the reaction aqueous solution is stirred at a constant speed, and the pH and temperature of the reaction aqueous solution are controlled to be in constant ranges to coprecipitate and crystallize nickel composite hydroxide particles in the reaction aqueous solution. Hereinafter, the respective materials and suitable crystallization conditions used in the crystallization process will be described.

(Mixed Aqueous Solution)

As the mixed aqueous solution, for example, a sulfate solution, a nitrate solution, or a chloride solution is used. The composition of the metal elements contained in the mixed aqueous solution and the composition of the metal elements contained in the nickel composite hydroxide particles obtained are approximately the same. Hence, the composition of the metal elements in the mixed aqueous solution can be adjusted so as to be the same as the composition of the metal elements in the intended nickel composite hydroxide.

(Alkaline Aqueous Solution)

As the alkaline aqueous solution, for example, sodium hydroxide or potassium hydroxide is used.

(Complexing Agent)

A complexing agent may be added to the mixed aqueous solution together with the alkaline aqueous solution. The complexing agent is not particularly limited, is only required to form a complex through binding with nickel ions and other metal ions in an aqueous solution, and examples thereof include an ammonium ion donor. The ammonium ion donor is not particularly limited, but for example, ammonia, ammonium sulfate, ammonium chloride, ammonium carbonate, or ammonium fluoride can be used.

(Temperature and pH of Reaction Aqueous Solution)

In the crystallization process (step S10), the complexing agent such as the ammonium ion donor described above may not be used. In other words, in the crystallization process, the ammonium ion concentration may not be controlled to be in a predetermined range. When a complexing agent is not used, the temperature of the reaction aqueous solution is preferably set to be in a range of more than 60° C. and 80° C. or less and the pH of the reaction aqueous solution at the above temperature is preferably 10 or more and pH 12 or less (at 25° C.).

When the pH of the reaction tank (reaction aqueous solution) exceeds 12 and crystallization proceeds, the nickel composite hydroxide particles become fine particles, the filterability deteriorates, and spherical particles may not be obtained. On the other hand, when the pH is less than 10, the generation speed of nickel composite hydroxide particles remarkably decreases, Ni remains in the filtrate, the precipitated Ni amount deviate from the intended composition, and the nickel composite hydroxide particles having the intended ratio may not be obtained.

When the temperature of the reaction aqueous solution exceeds 60° C., the solubility of Ni increases, and the precipitated Ni amount deviates from the intended composition, and the phenomenon that coprecipitation does not occur can be avoided. On the other hand, when the temperature of the reaction aqueous solution exceeds 80° C., the slurry concentration increases due to the great evaporated water amount, and the solubility of Ni decreases, crystals such as sodium sulfate are generated in the filtrate, the concentration of impurities increases, and there is the possibility that the charge and discharge capacity of the positive electrode active material decreases.

When an ammonium ion donor such as ammonia is used as a complexing agent, the solubility of Ni increases, thus the pH of the reaction aqueous solution is preferably 10 or more and 13 or less and the temperature of the reaction aqueous solution is preferably 30° C. or more and 60° C. or less.

The pH and temperature are preferably set to constant values from the viewpoint of making the composition of the nickel composite hydroxide particles obtained uniform. For example, the fluctuation range of pH is set to preferably less than ±0.4, more preferably less than ±0.3. When the fluctuation range of pH is large, the crystallization reaction may not be constant and nickel composite hydroxide particles with a uniform composition may not be obtained.

(Ammonium Ion Concentration)

The ammonium ion concentration in the reaction aqueous solution is preferably maintained at a constant value within a range of 3 g/L or more and 25 g/L or less. When the ammonium ion concentration is less than 3 g/L, the solubility of metal ions cannot be maintained constant, thus plate-like hydroxide primary particles having well-regulated shape and particle size are not formed, gel-like nuclei are likely to be generated, and the particle size distribution is also likely to be widened. On the other hand, when the ammonium ion concentration exceeds 25 g/L, the solubility of metal ions becomes too high, the amount of metal ions remaining in the reaction aqueous solution increases, and deviation of the composition is likely to occur.

When the ammonium ion concentration fluctuates, the solubility of metal ions fluctuates, nickel composite hydroxide particles having a uniform composition are not formed, and it is thus preferable to maintain the ammonium ion concentration at a constant value. For example, the ammonium ion concentration is preferably maintained at a desired concentration by setting the width between the upper limit and the lower limit to about 5 g/L.

(Dissolved Oxygen Concentration)

The dissolved oxygen concentration in the reaction aqueous solution is preferably adjusted to be in a range of 0.2 mg/L or more and 8.0 mg/L or less. By controlling the dissolved oxygen concentration to be in the above range, nickel composite hydroxide particles suitable as a precursor of the positive electrode active material can be obtained. During the crystallization process (step S10), it is preferable to control the dissolved oxygen concentration so as to be in a constant range from the viewpoint of making the composition of the nickel composite hydroxide particles obtained uniform. For example, the fluctuation range of the dissolved oxygen concentration is set to preferably less than ±0.2 mg/L, more preferably less than ±0.1 mg/L.

The dissolved oxygen concentration can be measured by the Winkler method (chemical analysis method), a diaphragm permeation method (electrochemical measurement method), fluorometry or the like. The dissolved oxygen concentration in the reaction aqueous solution can be adjusted by, for example, introducing gases such as inert gases (for example, $N_2$ gas and Ar gas) into the reaction tank and controlling the flow and composition of these gases. These gases may flow the space in the reaction tank or may be blown into the reaction aqueous solution. It is preferable to make the dissolved oxygen concentration in the entire reaction aqueous solution more uniform by appropriately stirring the reaction aqueous solution using a stirring device such as a stirring blade with power within the range to be described later.

(Filtration and Washing of Crystallization Product)

After a steady state attained, the crystallization product (precipitate) is collected, filtered, and washed with water to obtain nickel composite hydroxide particles. Alternatively, the mixed aqueous solution, the alkaline aqueous solution, and in some cases, an aqueous solution containing an ammonium ion donor are continuously supplied and allowed to overflow the reaction tank to collect the precipitate, and the precipitate is filtered and washed with water to obtain nickel-manganese composite hydroxide particles.

(Addition of Element M)

When nickel composite hydroxide particles contains the element M (at least one element selected from the group consisting of Co, W, Mo, V, Mg, Ca, Al, Ti, Cr, Zr and Ta), a method in which an aqueous solution containing the element M is added to the mixed aqueous solution containing nickel and manganese and nickel-manganese composite hydroxide particles (containing the element M) are coprecipitated is preferable as a method for blending the element M from the viewpoint of enhancing the productivity in the crystallization process.

As the aqueous solution containing the element M, for example, aqueous solutions containing cobalt sulfate, sodium tungstate, tungsten oxide, molybdenum oxide, molybdenum sulfide, vanadium pentoxide, magnesium sulfate, magnesium chloride, calcium chloride, aluminum sulfate, sodium aluminate, titanium sulfate, ammonium peroxotitanate, potassium titanium oxalate, zirconium hydroxide, zirconium sulfate, chromium chloride, sodium tantalate, tantalic acid and the like can be used.

The element M is at least one element selected from the group consisting of Co, W, Mo, V, Mg, Ca, Al, Ti, Cr, Zr and Ta and can be optionally added to improve the thermal stability, storage characteristics, battery characteristics, and the like.

In order to optimize the crystallization conditions and facilitate the control of composition ratio, a coating process of coating the element M may be provided after an alkaline aqueous solution is added to the mixed aqueous solution containing at least nickel and manganese and crystallization is performed.

The coating method is not particularly limited, a known method can be used, and examples thereof include 1) a method in which a nickel composite hydroxide obtained by adding an alkaline aqueous solution to a mixed aqueous solution containing nickel and manganese (excluding the element M) and subjecting the mixture to crystallization is coated with the element M or 2) a method in which a mixed aqueous solution containing nickel, manganese, and a part of the element M is prepared, nickel composite hydroxide particles (containing the element M) are coprecipitated, the coprecipitate is coated with the element M, and the content of M is adjusted.

An example of the method for applying the element M will be described below. First, the composite hydroxide particles obtained through crystallization are dispersed in pure water to form a slurry. Next, this slurry is mixed with a solution containing M in an amount corresponding to the intended amount of coverage, and an acid is added dropwise to the mixture to adjust the pH to a predetermined value. As the acid, for example, sulfuric acid, hydrochloric acid, or nitric acid is used. Next, the slurry is mixed for a predetermined time and then filtered and the residue is dried, whereby composite hydroxide particles coated with the element M can be obtained. Examples of other coating methods include a spray drying method in which a solution containing a compound containing M is sprayed onto the composite hydroxide particles and then dried and a method in which the composite hydroxide particles are impregnated with a solution containing a compound containing M.

In the crystallization process (step S10), a batch type crystallization method or a continuous type crystallization method may be used. For example, in the case of batch type crystallization method, the precipitate is collected, filtered, and washed with water after the reaction aqueous solution in the reaction tank has reached a steady state to obtain nickel composite hydroxide particles. In the case of continuous type crystallization method, a mixed aqueous solution, an alkaline aqueous solution, and in some cases, an aqueous solution containing an ammonium ion donner are continuously supplied and allowed to overflow the reaction tank to collect the precipitate, and the precipitate is filtered and washed with water to obtain composite hydroxide particles.

[Thermal Treatment Process (Step S11)]

The production method of the present embodiment may include a process (step S11) of subjecting the nickel composite hydroxide particles to a thermal treatment before the mixing process (step S20) to be described later (see FIG. 2). By the thermal treatment, at least a part of water contained in the nickel composite hydroxide particles is removed. It is possible to prevent variations in Li/Me in the positive electrode active material obtained in the firing process (step S30) by removing at least a part of water remaining in the nickel composite hydroxide particles. Nickel composite oxide particles having an atomic ratio similar to the element ratio (2) of the metal elements may be obtained by subjecting the nickel composite hydroxide particles to a thermal treatment.

The thermal treatment may be performed by heating the nickel composite hydroxide particles to a temperature at which remaining water is removed, and for example, the temperature for the thermal treatment is preferably set to 105° C. or more and 700° C. or less. When the nickel composite hydroxide particles are heated at 105° C. or more, at least a part of remaining water can be removed. It is not industrially suitable that the temperature for the thermal treatment is less than 105° C. since it takes a long time to remove the remaining water. On the other hand, when the temperature for the thermal treatment exceeds 700° C., the particles converted into the composite oxide particles may be sintered and aggregated. For example, when most of nickel composite hydroxide particles are converted into nickel composite oxide particles, the temperature for the thermal treatment is preferably set to 350° C. or more and 700° C. or less.

The atmosphere in which the thermal treatment is performed is not particularly limited, and for example, it is preferable that the thermal treatment is performed in an air stream from the viewpoint of easy operation. The time for the thermal treatment is not particularly limited and can be set to, for example, 1 hour or more. When the time for the thermal treatment is less than 1 hour, water remaining in the composite hydroxide particles may not be sufficiently removed. The time for the thermal treatment is preferably 5 hours or more and 15 hours or less. The equipment used for the thermal treatment is not particularly limited, is only required to heat the composite hydroxide particles in an air stream, and for example, a fan drying machine and an electric furnace that does not generate gas can be suitably used.

In the thermal treatment, nickel composite oxide particles represented by a general formula (3): $Ni_{1-a-b}Mn_aM_bO_{1+\beta}$ (where M is at least one element selected from the group consisting of Co, W, Mo, V, Mg, Ca, Al, Ti, Cr, Zr and Ta, $0.05 \leq a \leq 0.6$, $0 \leq b \leq 0.6$, and $0 \leq \beta \leq 0.4$) may be obtained, for example, by subjecting the nickel composite hydroxide particles obtained in the crystallization process (step S10) to a thermal treatment (roasting).

[Mixing Process (Step S20)]

Next, at least either (precursor particles) of nickel-manganese composite hydroxide particles or nickel-manganese composite oxide particles, a niobium compound, and a lithium compound are mixed together (step S20). For example, a lithium-niobium mixture may be obtained by mixing (step S20) the precursor particles obtained, a niobium compound, and a lithium compound after the thermal treatment process (step S11).

It is possible to fire the lithium-niobium mixture at a relatively high temperature by containing manganese in the primary particles of the precursor particles. By performing firing at a high temperature, manganese and niobium can be uniformly distributed (solid-dissolved) in a plurality of primary particles of the positive electrode active material obtained. The positive electrode active material in which manganese and niobium are contained (solid-dissolved) in a plurality of primary particles exhibits high thermal stability and a decreased conductivity.

In the mixing process (step S20), as the precursor particles, nickel composite hydroxide particles may be used singly, nickel composite oxide particles may be used singly, or both nickel composite hydroxide particles and nickel composite oxide particles may be used. As the nickel composite oxide particles, the nickel composite oxide particles represented by the general formula (3) may be used. The nickel-manganese composite oxide particles represented by the general formula (3) may be obtained by a method other than the thermal treatment. In the mixing process (step S20), one or more selected from the group consisting of the nickel composite hydroxide particles represented by the general formula (2) and the nickel composite oxide particles represented by the general formula (3), a niobium compound, and a lithium compound may be mixed together.

As the niobium compound, a known compound containing niobium can be used, for example, niobic acid, niobium oxide, niobium nitrate, niobium pentachloride, and niobium nitrate can be used. Among these, niobic acid, niobium oxide, or a mixture thereof is preferable from the viewpoint of easy availability and of avoiding mixing of impurities into the lithium-metal composite oxide. When impurities are mixed into the lithium-metal composite oxide, decreases in thermal stability, battery capacity, and cycle characteristics of the secondary battery obtained may be caused.

The niobium compound is preferably mixed as particles (solid phase). When niobium is added as a solid phase, the particle size of the niobium compound changes the reactivity in the subsequent firing process (step S30), and thus the particle size of the niobium compound used is one of the important factors. The average particle size of the niobium compound is preferably 0.01 µm or more and 10 µm or less, more preferably 0.05 µm or more and 3.0 µm or less, still more preferably 0.08 µm or more and 1.0 µm or less. When the average particle size is smaller than 0.01 µm, problems may arise that it is significantly difficult to handle the powder and the niobium compound scatters and the intended composition cannot be imparted to the active material in the mixing process (step S20) and the firing process (step S30). On the other hand, when the average particle size is larger than 10 µm, Nb may not be uniformly distributed in the lithium-metal composite oxide after firing and thermal stability may not be secured. The average particle size is a volume average particle size MV and can be determined from, for example, a volume integrated value measured by a laser light diffraction/scattering type particle size distribution analyzer.

The niobium compound may be pulverized in advance so as to have a particle size in the above range by using various pulverizers such as ball mill, planetary ball mill, jet mill/nano jet mill, bead mill, and pin mill. The niobium compound may be classified by a dry classifier or sieving, if necessary. For example, sieving can be performed to obtain particles close to 0.01 µm.

The lithium compound is not particularly limited, and a known compound containing lithium can be used, and for example, lithium carbonate, lithium hydroxide, lithium nitrate, or a mixture thereof is used. Among these, lithium carbonate, lithium hydroxide, or a mixture thereof is preferable from the viewpoint of being less affected by remaining impurities and melting at the firing temperature.

The method for mixing the precursor particles, the lithium compound, and the niobium compound is not particularly limited, it is only required that the precursor particles, the lithium compound, and the niobium compound are sufficiently mixed with each other to the extent to which the skeletons of the precursor particles and the like are not destroyed. As the mixing method, for example, mixing can be performed using a general mixer, and for example, mixing can be performed using a shaker mixer, a Loedige mixer, a Julia mixer, a V blender, and the like. It is preferable to sufficiently mix the lithium-niobium mixture before the firing process (step S30) to be described later. When mixing is not sufficiently performed, the ratio (Li/Me) of Li to the metal elements Me other than Li may vary between the individual particles of the positive electrode active material and problems may arise that sufficient battery characteristics are not attained.

The lithium compound is mixed so that Li/Me in the lithium-niobium mixture is 0.95 or more and 1.2 or less. In other words, the lithium compound is mixed so that Li/Me in the lithium-niobium mixture is the same as Li/Me in the positive electrode active material obtained. This is because Li/Me in the lithium-niobium mixture in this mixing process (step S20) becomes Li/Me in the positive electrode active material since Li/Me and the molar ratio of the respective metal elements do not change after the firing process (step S30). The niobium compound is mixed so that the niobium content in the lithium-niobium mixture is 0.03 atomic % or more and 3 atomic % or less with respect to the sum of metal elements (Ni, Mn, elements M, Nb) other than Li in the lithium-niobium mixture.

The mixing process (step S20) may include, for example, a crystallization process (step S10) of obtaining precursor particles through crystallization, a niobium coating process of obtaining precursor particles coated with a niobium compound by adding a niobium salt solution and an acid to a slurry obtained by mixing the precursor particles obtained and water, and a process of obtaining a lithium-niobium mixture by mixing the precursor particles coated with a niobium compound and a lithium compound. The method for adding a niobium compound in the mixing process (step S20) may be solid phase addition or addition by the above-described niobium coating process, but solid phase addition is industrially preferable from the viewpoint of productivity.

[Calcination Process (Step S25)]

When lithium hydroxide or lithium carbonate is used as the lithium compound, it is preferable to hold the lithium-niobium mixture at a temperature of being lower than the firing temperature and 350° C. or more and 800° C. or less, preferably 450° C. or more and 780° C. or less for calcination before the firing process (step S30) to be described later. The holding time at the temperature for calcination is, for example, about 1 hour or more and 10 hours or less, preferably 3 hours or more and 6 hours or less. When calcination is performed, lithium is sufficiently diffused into the nickel composite hydroxide particles and a more uniform lithium-metal composite oxide can be obtained. For example, when lithium carbonate is used as the lithium compound, it is preferable to hold the lithium-niobium mixture at a temperature of 400° C. or more and 700° C. or less for 1 hour or more and 10 hours or less for calcination.

[Firing Process (Step S30)]

Next, the lithium-niobium mixture obtained is fired (step S30). By firing, lithium in the lithium compound is diffused into the precursor particles and thus a lithium-metal composite oxide (positive electrode active material) composed of particles having a polycrystalline structure is formed. The lithium compound melts at a temperature when firing and penetrates into the nickel composite hydroxide particles to form a lithium-metal composite oxide. At this time, the niobium compound penetrates into the interior of the secondary particles of the precursor particles together with the molten lithium compound. If there are crystal grain boundaries and the like inside the primary particles, the niobium compound penetrates thereinto. By this, diffusion of niobium inside the primary particles is promoted and at least a part of niobium is solid-dissolved in the primary particles in the lithium-metal composite oxide obtained. A part of niobium compound may be formed on the surface of the primary particles as a lithium-niobium compound.

(Firing Temperature)

The firing temperature of the lithium-niobium mixture is preferably 850° C. or more and 1000° C. or less, more preferably 900° C. or more and 950° C. or less. When the firing temperature is in the above range, melting of the lithium compound occurs and penetration and diffusion of the niobium compound is promoted. By increasing the temperature, the diffusion of niobium is promoted, the crystallinity of the lithium-metal composite oxide is enhanced, and the output characteristics and the energy density can be improved.

On the other hand, when the firing temperature is less than 850° C., diffusion of lithium and niobium into the nickel composite hydroxide particles is not sufficiently performed, unreacted lithium compound and niobium compound may remain or the crystal structure of the lithium-metal composite oxide may not be sufficiently arranged and the battery characteristics may decrease. On the other hand, when the firing temperature exceeds 1000° C., sintering may violently occur between the particles of the lithium-metal composite oxide and abnormal grain growth may occur. When abnormal grain growth occurs, the particles after firing become coarse and the particle morphology cannot be maintained or the specific surface area of the positive electrode active material may decrease, the positive electrode resistance of the secondary battery may increase, and the battery capacity may decrease.

(Firing Time)

The firing time is not particularly limited as long as the sintering reaction between the precursor particles and the lithium compound is sufficiently performed and is, for example, 1 hour or more, preferably 3 hours or more and 24 hours or less. When the firing time is less than 1 hour, the lithium-metal composite oxide may not be sufficiently generated.

(Firing Atmosphere)

The atmosphere when firing is an oxidizing atmosphere. Here, the oxidizing atmosphere means an atmosphere having an oxygen concentration of 3% by volume or more and 100% by volume or less. When the oxygen concentration in the firing atmosphere is less than 3% by volume, the positive electrode active material obtained cannot be sufficiently oxidized and may be in a state in which the crystallinity of the lithium-metal composite oxide is insufficient. The firing is preferably performed in the air or an oxygen stream and is preferably performed in an oxygen stream from the viewpoint of improving battery characteristics.

(Firing Furnace)

The furnace (firing furnace) used for firing is not particularly limited and is only required to fire the lithium-niobium mixture in the air or an oxygen stream. The firing furnace is preferably an electric furnace that does not generate gas. As the firing furnace, a batch type furnace or a continuous type furnace may be used.

The lithium-metal composite oxide obtained after firing may be used as a positive electrode active material. In the lithium-metal composite oxide obtained after firing, sintering between particles is suppressed but coarse particles may be formed by weak sintering and aggregation. In such a case, the lithium-metal composite oxide may be used as a positive electrode active material after the sintering and aggregation is eliminated by crushing and the particle size distribution is adjusted.

[Eluted Lithium Amount]

The positive electrode active material (lithium-metal composite oxide) obtained after the firing process (step S30) is adjusted so that the amount of lithium (eluted lithium amount) to be eluted into water when the positive electrode active material is immersed in water is 0.02% by mass or more and 0.10% by mass or less with respect to the entire positive electrode active material as determined by a neutralization titration method. When the eluted lithium amount is in the above range, niobium is uniformly distributed inside and/or on the surface of the primary particles of the positive electrode active material, gelation of the positive electrode paste is suppressed, and the battery characteristics of the secondary battery can be improved.

From the viewpoint of further improving the battery characteristics, the lower limit of the amount of lithium eluted from the positive electrode active material is preferably 0.03% by mass or more, more preferably 0.04% by mass or more. When the lower limit of the eluted lithium amount is too small, the lithium-niobium compound may be excessively or non-uniformly formed on the surface of the primary particles of the lithium-metal composite oxide and the battery capacity and the like may decrease.

The eluted lithium amount is a value that fluctuates depending on the composition and production method of the positive electrode active material as described above. The amount of lithium eluted from the positive electrode active material according to the present embodiment is preferably adjusted so as to be, for example, lower than the amount of lithium eluted from the positive electrode active material produced under the same production conditions except that the niobium compound is not mixed by 0.03% by mass or more, preferably 0.04% by mass or more. The fact that the eluted lithium amount is decreased by the above range is considered to indicate that niobium is uniformly distributed inside and/or on the surface of the primary particles of the positive electrode active material.

The eluted lithium amount can be determined by taking 5 g of the positive electrode active material, putting, immersing, and stirring the positive electrode active material in 100 ml of pure water at 25° C. for 30 minutes, then performing filtration, subjecting the filtrate to neutralization titration using an aqueous HCl solution, and calculating the amount of lithium eluted into the pure water (% by mass with respect to the entire amount of positive electrode active material).

The eluted lithium amount can be controlled to be in the above range by containing manganese and niobium in specific ranges in the production process of the positive electrode active material and adjusting the dissolved oxygen concentration in the reaction solution, the temperature of the reaction solution, and the like in the crystallization process (step S10), adjusting the firing temperature in the firing process (step S30), or adding the calcination process before the firing process (step S30).

Figure 3:
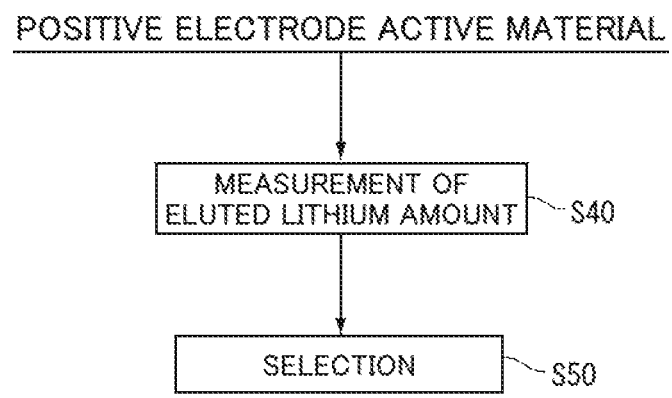
FIG. 3 is a diagram illustrating an example of a method for evaluating a positive electrode active material according to the present embodiment.

3. Method for Evaluating Positive Electrode Active Material for Non-Aqueous Electrolyte Secondary Battery The method for evaluating a positive electrode active material for non-aqueous electrolyte secondary battery according to the present embodiment (hereinafter, also referred to as "method for evaluating a positive electrode active material") includes measuring (step S40) the amount of lithium that is eluted into water when the positive electrode active material is immersed in water (hereinafter, also referred to as "eluted lithium amount") and determined by a neutralization titration method and selecting (step S50) a positive electrode active material in which the eluted lithium amount is 0.02% by mass or more and 0.10% by mass or less with respect to the entire positive electrode active material as illustrated in FIG. 3. By the evaluation method of the present embodiment, it is possible to conveniently select a positive electrode active material which can suppress the gelation at the time of positive electrode paste fabrication and can provide a secondary battery having a high battery capacity. Step S50 may be included in the method for producing a positive electrode active material described above.

The positive electrode active material used in the evaluation method of the present embodiment contains lithium-nickel-manganese composite oxide represented by a general formula (1): $Li_dNi_{1-a-b-c}Mn_aM_bNb_cO_{2+\alpha}$ (where M is at least one element selected from the group consisting of Co, W, Mo, V, Mg, Ca, Al, Ti, Cr, Zr and Ta, $0.05 \leq a \leq 0.6$, $0 \leq b \leq 0.6$, $0.0003 \leq c \leq 0.03$, $0.95 \leq d \leq 1.2$, $0.33 < (1-a-b-c)$, and $0 \leq \alpha \leq 0.4$). The preferable range and characteristics of the respective elements constituting the general formula (1) are similar to those in the positive electrode active material described above.

[Process of Measuring Eluted Lithium Amount (Step S40)]

First, the amount of lithium that is eluted into water (eluted lithium amount) when the positive electrode active material to be evaluated is immersed in water is measured by a neutralization titration method. The eluted lithium amount can be determined by taking 5 g of the positive electrode active material, putting, immersing, and stirring the positive electrode active material in 100 ml of pure water at 25° C. for 30 minutes, then performing filtration, subjecting the filtrate to neutralization titration using an aqueous HCl solution, and calculating the amount of lithium eluted into the pure water (% by mass with respect to the entire amount of positive electrode active material).

In the positive electrode active material represented by the general formula (1), the amount of lithium eluted from the positive electrode active material obtained can be decreased when niobium uniformly exists inside and/or on the surface of the primary particles. Hence, the existence form of niobium can be indirectly evaluated by measuring the eluted lithium amount.

[Process of Selecting Positive Electrode Active Material (Step S50)]

Next, a positive electrode active material in which the amount of lithium to be eluted into water (eluted lithium amount) is 0.02% by mass or more and 0.10% by mass or less with respect to the entire positive electrode active material is selected. By selecting a positive electrode active material in which the eluted lithium amount is in the above range, it is possible to easily obtain a positive electrode active material which suppresses gelation of the positive electrode paste and exhibits high battery characteristics at high productivity.

The eluted lithium amount is a value that fluctuates depending on the composition and production method of the positive electrode active material as described above. It is preferable to select a positive electrode active material in which the amount of lithium eluted from the positive electrode active material according to the present embodiment is, for example, lower than the amount of lithium eluted from the positive electrode active material produced under the same production conditions except that the niobium compound is not mixed by 0.03% by mass or more, preferably 0.04% by mass or more. The fact that a positive electrode active material in which the eluted lithium amount is in the above range is selected is considered to indicate that niobium is uniformly distributed inside and/or on the surface of the primary particles of the positive electrode active material, and it is possible to easily obtain a positive electrode active material having high battery characteristics at high productivity.

4. Non-Aqueous Electrolyte Secondary Battery

In the non-aqueous electrolyte secondary battery (hereinafter also referred to as "secondary battery") according to the present embodiment, the positive electrode active material described above is used in the positive electrode. Hereinafter, an example of the secondary battery of the present embodiment will be described for each component. The secondary battery of the present embodiment includes a positive electrode, a negative electrode, and a non-aqueous electrolyte and is composed of similar components to those of a general lithium ion secondary battery. The embodiments described below are merely examples, and the non-aqueous electrolyte secondary battery can be implemented in various modified and improved forms based on the knowledge of those skilled in the art including the following embodiments. The use of the secondary battery is not particularly limited.

(Positive Electrode)

The positive electrode of the secondary battery is fabricated using the positive electrode active material described above. An example of the method for producing the positive electrode will be described below. First, the (powdered) positive electrode active material described above, a conductive material, and a binding agent (binder) are mixed together, activated carbon and a solvent for viscosity adjustment and the like are further added to the mixture if necessary, and the resulting mixture is kneaded to fabricate a positive electrode mixture paste (also referred to as "positive electrode paste").

The mixing ratio of the respective materials in the positive electrode mixture is a factor that determines the performance of the lithium secondary battery and thus can be adjusted according to the use. The mixing ratio of the materials can be similar to that of the positive electrode of a known lithium secondary battery, and for example, when the entire mass of the solids in the positive electrode mixture excluding the solvent is 100% by mass, the positive electrode active material can be contained at 60% to 95% by mass, the conductive material can be contained at 1% to 20% by mass, and the binding agent can be contained at 1% to 20% by mass.

The positive electrode mixture paste obtained is applied to, for example, the surface of an aluminum foil current collector and dried to scatter the solvent, whereby a sheet-like positive electrode is fabricated. Pressurization may be performed by roll press or the like in order to increase the electrode density if necessary. The sheet-like positive electrode thus obtained can be cut into a proper size according to the intended battery and used in the fabrication of the battery. However, the method for fabricating the positive electrode is not limited to the above-exemplified method, and other methods may be used.

As the conductive material, for example, graphite (natural graphite, artificial graphite, expanded graphite, and the like), and carbon black-based materials such as acetylene black and ketjen black can be used.

The binding agent (binder) plays a role of connecting the active material particles together, and for example, polyvinylidene fluoride (PVDF), polytetrafluoroethylene (PTFE), fluororubber, ethylene propylene diene rubber, styrene butadiene, cellulosic resin, and polyacrylic acid can be used.

A solvent which disperses the positive electrode active material, the conductive material, and the activated carbon and dissolves the binding agent is added to the positive electrode mixture if necessary. Specifically, an organic solvent such as N-methyl-2-pyrrolidone can be used as the solvent. Activated carbon can be added to the positive electrode mixture in order to increase the electric double layer capacity.

(Negative Electrode)

As the negative electrode, metal lithium, lithium alloy, and the like can be used. As the negative electrode, a negative electrode may be used which is formed by mixing a binding agent with a negative electrode active material which can insert and de-insert lithium ions, adding a proper solvent thereto to form a paste-like negative electrode mixture, applying the paste-like negative electrode mixture to the surface of a metal foil current collector such as copper, drying the negative electrode mixture, and compressing the negative electrode mixture in order to increase the electrode density if necessary.

Examples of the negative electrode active material include natural graphite, artificial graphite, a fired organic compound such as phenol resin, and a powdery carbon material such as coke. In this case, as the negative electrode binding agent, fluorine-containing resin such as PVDF can be used as in the positive electrode, an organic solvent such as N-methyl-2-pyrrolidone can be used as the solvent for dispersing these active material and binding agent.

(Separator)

A separator is disposed by being interposed between the positive electrode and the negative electrode. The separator separates the positive electrode and the negative electrode from each other and retains the electrolyte, a known separator can be used, and for example, a thin film such as polyethylene or polypropylene having a large number of minute pores can be used.

(Non-Aqueous Electrolyte)

The non-aqueous electrolyte is, for example, a non-aqueous electrolyte solution or a solid electrolyte. The non-aqueous electrolyte solution is obtained by dissolving a lithium salt as a supporting salt in an organic solvent. As the organic solvent, one selected from the group consisting of cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, further, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate can be used singly or two or more of these can be used in mixture.

As the supporting salt, $LiPF_6$, $LiBF_4$, $LiClO_4$, $LiAsF_6$, $LiN(CF_3SO_2)_2$, any composite salt thereof, and the like can be used. Furthermore, the non-aqueous electrolyte solution may contain a radical scavenger, a surfactant, a flame retardant, and the like.

(Shape and Configuration of Secondary Battery)

The non-aqueous electrolyte secondary battery of the present invention including the positive electrode, negative electrode, separator, and non-aqueous electrolyte solution described above can be fabricated in various shapes such as a cylindrical shape and a laminated shape. Even when the non-aqueous electrolyte secondary battery has any shape, the positive electrode and the negative electrode are laminated with the separator interposed therebetween to form an electrode body, the obtained electrode body is impregnated with the non-aqueous electrolyte solution, the positive electrode current collector is connected to the positive electrode terminal communicating with the outside using a current collecting lead or the like, the negative electrode current collector is connected to the negative electrode terminal communicating with the outside using a current collecting lead or the like, and the resulting product is sealed in the battery case to complete the non-aqueous electrolyte secondary battery.

(Characteristics of Secondary Battery)

The secondary battery according to the present embodiment can achieve both high battery capacity and durability and high thermal stability by suppression of oxygen release at the time of overcharge. The positive electrode active material used in the secondary battery according to the present embodiment can be obtained by the industrial production method as described above. Hence, the secondary battery according to the present embodiment can be suitably used as a power source for small portable electronic devices (such as notebook personal computers and mobile phone terminals) which are always required to have a high capacity, a power source for electric cars, a power source for hybrid cars, and the like.

EXAMPLES

Hereinafter, the present invention will be described in more detail with reference to Examples and Comparative Examples of the present invention, but the present invention is not limited to these Examples at all. The methods for analyzing the metals contained in the positive electrode active materials and various methods for evaluating the positive electrode active materials in Examples and Comparative Examples are as follows.

(1) Analysis of Composition

The compositions of the nickel-manganese composite hydroxides and positive electrode active materials obtained were measured by ICP atomic emission spectroscopy.

(2) Average Particle Size MV

The average particle size (volume average particle size MV) was measured using a laser diffraction/scattering particle size distribution analyzer (Microtrac HRA manufactured by Nikkiso Co., Ltd.).

(3) Crystallite Diameter and Detection of Lithium-Niobium Compound

The crystal structure of the positive electrode active material obtained and the qualitative evaluation of the lithium-niobium compound were performed using an XRD diffractometer (X'Pert PRO manufactured by PANalytical Inc.). The crystallite diameter of (003) plane was calculated from the XRD measurement result by analyzing the peak of (003) plane existing near $2\theta=18°$ and using the Scherrer equation.

(4) Niobium Concentration

The positive electrode active material was processed so that cross section analysis of primary particles by S-TEM was possible. Thirty primary particles were arbitrarily selected from a plurality of secondary particles contained in the positive electrode active material, and the compositions in the cross sections of individual primary particles were subjected to line analysis by EDX of S-TEM. At that time, as the direction of the line analysis, a direction was selected in which the measured value of the niobium concentration in the vicinity of the surface of the primary particles was not affected by the existence of niobium compound on the surface of the primary particles since surface analysis was performed in advance and a length to be 50% or more of the maximum length of the primary particles was able to be analyzed. The maximum niobium concentration and the average niobium concentration in the primary particles were determined from the measured values of the niobium concentrations attained by the line analysis, the ratios of the maximum niobium concentrations in the individual primary particles were respectively calculated, further, the ratio of the maximum niobium concentration of the positive electrode active material was determined by attaining the number average of the ratios of the maximum niobium concentrations calculated from the respective primary particles.

(5) Eluted Lithium Amount

The eluted lithium amount was determined by taking 5 g of the positive electrode active material obtained after crushing, putting, immersing, and stirring the positive electrode active material in 100 ml of pure water at 25° C. for 30 minutes, then performing filtration, subjecting the filtrate to neutralization titration using an aqueous HCl solution, and calculating the amount of lithium eluted into the pure water (% by mass with respect to the entire amount of positive electrode active material).

(6) Initial Charge Capacity and Initial Discharge Capacity

Figure 4:
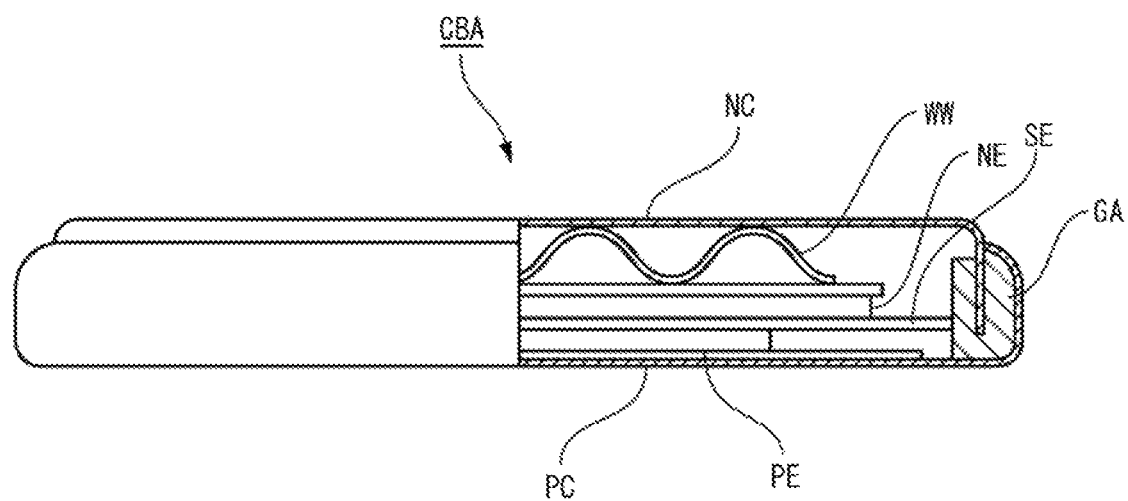
FIG. 4 is a schematic diagram of a coin-type battery used for battery evaluation.

With regard to the initial charge capacity and initial discharge capacity, a coin-type battery CBA (2032 type coin battery) illustrated in FIG. 4 was fabricated and then left to stand for about 24 hours to stabilize the open circuit voltage (DCV), then the battery was charged to a cutoff voltage of 4.3 V at a current density of 0.1 mA/cm$^2$ with respect to the positive electrode to take the capacity at this time as the initial charge capacity, the battery paused for one hour and was then discharged to a cutoff voltage of 3.0 V, and the capacity at this time was taken as initial discharge capacity. A multi-channel voltage/current generator (R6741A manufactured by Advantest Corporation) was used to measure the discharge capacity.

The coin battery CBA was fabricated by the following method. First, 52.5 mg of the positive electrode active material obtained, 15 mg of acetylene black, and 7.5 mg of polytetrafluoroethylene resin (PTFE) were mixed together and press-molded so as to have a diameter of 11 mm and a thickness of 100 μm at a pressure of 100 MPa, thereby fabricating a positive electrode (electrode for evaluation) PE illustrated in FIG. 4. The positive electrode PE fabricated was dried in a vacuum dryer at 120° C. for 12 hours, and then a coin-type battery CBA was fabricated using this positive electrode PE in a glove box in an Ar atmosphere with a dew point controlled to −80° C. As a negative electrode NE, lithium (Li) metal having a diameter of 17 mm and a thickness of 1 mm was used. As an electrolyte solution, an equal volume mixed solution (manufactured by Toyama Pharmaceutical Co., Ltd.) of ethylene carbonate (EC) and diethyl carbonate (DEC) containing 1 M LiClO$_4$ as a supporting electrolyte was used. As a separator SE, a polyethylene porous film having a thickness of 25 μm was used. The coin-type battery CBA included a gasket GA and a wave washer WW and was assembled into a coin-type battery using a positive electrode can PC and a negative electrode can NC.

(7) Evaluation of Stability of Positive Electrode Paste

A positive electrode mixture paste was obtained by mixing 25.0 g of a positive electrode active material, 1.5 g of carbon powder as a conductive material, 2.9 g of polyvinylidene fluoride (PVDF), and N-methyl-2-pyrrolidone (NMP) using a planetary motion kneader. The amount of N-methyl-2-pyrrolidone (NMP) added was adjusted by a viscosity measurement method using a vibration viscometer specified in JIS Z 8803: 2011 so that the viscosity was 1.5 to 2.5 Pa·s. The paste obtained was stored for 76 hours, and the occurrence situation of gelation was visually evaluated. A situation in which gelation did not occur was evaluated as ○ and a situation in which gelation occurred was evaluated as x.

Example 1

(Crystallization Process)

A predetermined amount of pure water was put into the reaction tank (60 L), and the temperature inside the tank was set to 70° C. while stirring the water. At this time, N$_2$ gas was allowed to flow into the reaction tank so that the dissolved oxygen concentration in the reaction tank liquid was a constant value in a range of 0.2 mg/L or more and 0.8 mg/L or less. N$_2$ gas was also supplied to the reaction tank during the crystallization process and adjusted so that the dissolved oxygen concentration in the reaction tank liquid was maintained at a constant value in a range of 0.2 mg/L or more and 0.8 mg/L or less throughout the crystallization process. A 2.0 M mixed aqueous solution of nickel sulfate, cobalt sulfate, and manganese sulfate and a 25% by mass sodium hydroxide solution as an alkaline solution were continuously added into this reaction tank at the same time so that the molar ratio among nickel:cobalt:manganese was 55:25:20.

Before start of the addition of the 2.0 M mixed aqueous solution of nickel sulfate, cobalt sulfate, and manganese sulfate and 25% by mass sodium hydroxide solution to the reaction tank, N$_2$ gas was allowed to flow thereinto and adjusted so that the dissolved oxygen concentration in each solution (the mixed aqueous solution and the sodium hydroxide solution) was a constant value in a range of 0.2 mg/L or more and 0.8 mg/L or less, and N$_2$ gas was supplied and adjusted so that the dissolved oxygen concentration in each solution was maintained at a constant value in a range of 0.2 mg/L or more and 0.8 mg/L or less during the crystallization process as well. The sodium hydroxide solution was heated to 70° C. before start of the addition and adjusted so as to be maintained at 70° C. during the addition thereof to the reaction tank.

The flow was controlled so that the residence time of the mixed aqueous solution was 8 hours, and the pH was controlled to 10.8 to 11.1 (fluctuation range of pH: less than 0.3) so that the dissolved nickel concentration in the reaction tank was 350 mg/L. After the reaction tank was stabilized, a slurry containing nickel-cobalt-manganese composite hydroxide was recovered through the overflow port and filtered to obtain a cake of nickel-cobalt-manganese composite hydroxide (crystallization process). Impurities were washed by allowing 1 L of pure water to pass through 140 g of nickel-cobalt-manganese composite hydroxide in the Denver used for filtration (washing process).

The powder after filtration was put into a dryer and held at 400° C. for 5 hours in an air stream (oxygen: 21% by volume) for thermal treatment, thereby obtaining nickel-cobalt-manganese composite hydroxide particles/nickel-cobalt-manganese composite oxide particles (hereinafter, also referred to as "precursor particles") in which the molar ratio (atomic ratio) among nickel:cobalt:manganese was 55:25:20.

(Mixing Process)

The precursor particles obtained, lithium carbonate, and niobic acid (Nb$_2$O$_5$·nH$_2$O) having an average particle size of 1.0 μm were weighed so that the molar ratio among nickel:cobalt:manganese:niobium was 54.6:24.7:19.7:1.0 and the atomic ratio (Li/Me) of lithium to the total metal amount of nickel, cobalt, manganese, and niobium was 1.03, and then thoroughly mixed together using a shaker mixer device (TURBULA Type T2C manufactured by Willy A. Bachofen (WAB) AG) to obtain a lithium-niobium mixture.

(Firing Process)

The lithium-niobium mixture obtained was put into a firing furnace and held at a furnace temperature of 700° C. for 3 hours in an air stream (oxygen: 21% by volume) for calcination. Next, the temperature inside the furnace was raised to 900° C., and the resulting lithium-niobium mixture was held at the temperature for 10 hours for firing. The fired product after firing was cooled and crushed to obtain lithium-nickel-cobalt-manganese-niobium composite oxide particles (positive electrode active material).

Figure 5:
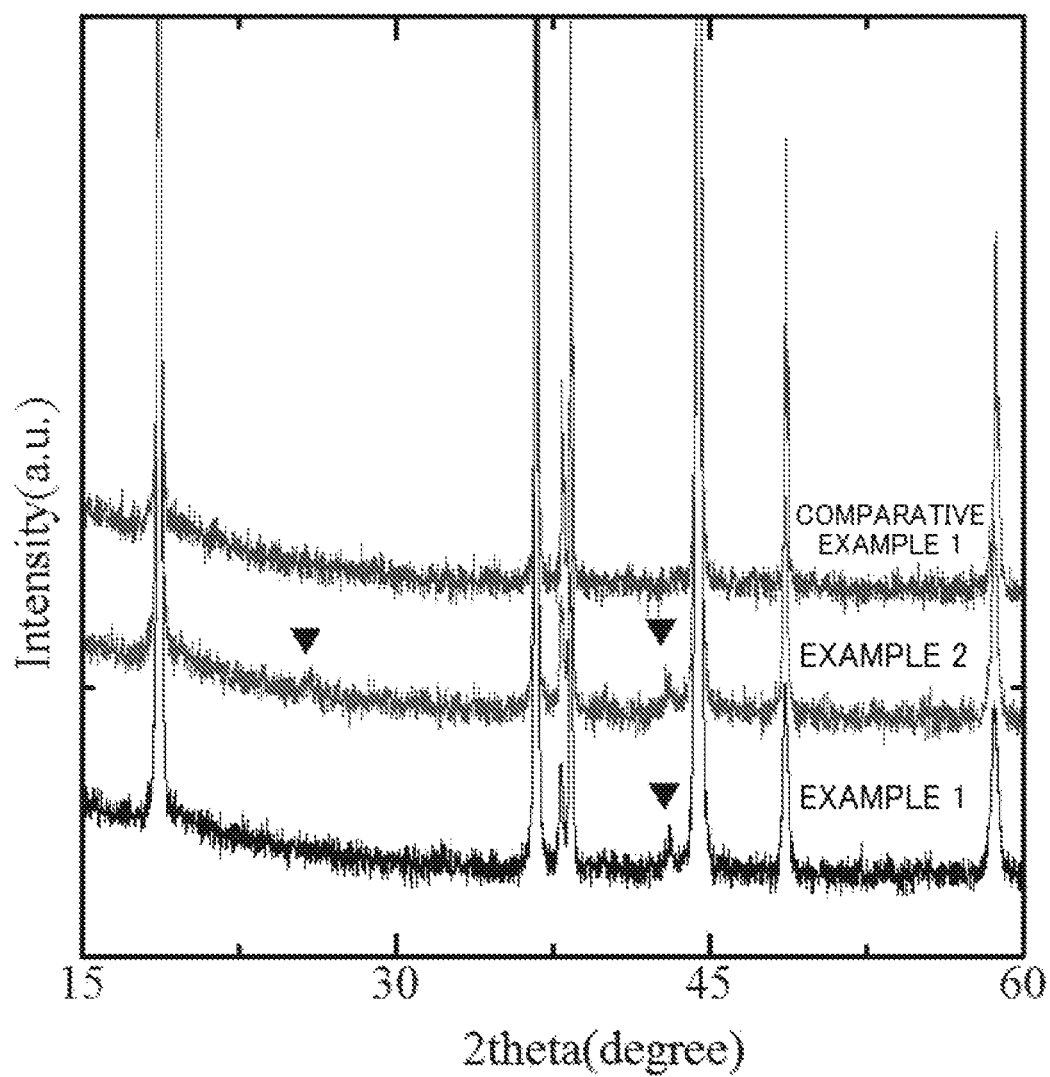
FIG. 5 is a diagram illustrating results of XRD measurement in Examples and Comparative Examples.

The volume average particle size MV of the positive electrode active material obtained is presented in Table 1. As a result of XRD measurement, a peak attributed to a lithium-niobium compound (Li—Nb compound) was confirmed as a heterogenous phase as illustrated in FIG. 5. From the results of STEM-EDX analysis, it was confirmed that niobium was solid-dissolved in the crystal structure and the maximum niobium concentration inside the primary particles was in a range of 1 to 3 times the average niobium concentration inside the primary particles. The crystallite diameter of (003)

plane was calculated from the XRD measurement result using the Scherrer equation and was 125.5 nm (1255 A).

(Evaluation on Electrochemical Characteristics)

The evaluation on the battery characteristics (initial charge and discharge capacity) of a secondary battery fabricated using the positive electrode active material obtained was performed by the above methods. These evaluation results are presented in Table 1.

Example 2

Precursor particles having a molar ratio (atomic ratio) among nickel:cobalt:manganese of 60:20:20 were obtained in the same manner as the crystallization process of Example 1. The precursor particles obtained, lithium carbonate, and niobic acid ($Nb_2O_5 \cdot nH_2O$) having an average particle size of 1.0 μm were weighed so that the molar ratio among nickel:cobalt:manganese:niobium was 59.6:19.7:19.7:1.0 and Li/Me was 1.03, and then thoroughly mixed together using a shaker mixer device (TURBULA Type T2C manufactured by Willy A. Bachofen (WAB) AG) to obtain a lithium-niobium mixture. The processes from the firing process were performed in the same manner as in Example 1 to obtain and evaluate a positive electrode active material. As a result of XRD measurement, a peak attributed to a lithium-niobium compound was confirmed as a heterogenous phase as illustrated in FIG. 5. From the results of STEM-EDX analysis, it was confirmed that niobium was solid-dissolved in the crystal structure and the maximum niobium concentration inside the primary particles was in a range of 1 to 3 times the average niobium concentration inside the primary particles. Other evaluation results are presented in Table 1.

Comparative Example 11

A positive electrode active material was obtained and evaluated in the same manner as in Example 1 except that the precursor particles obtained and lithium carbonate were weighed so that the molar ratio among nickel:cobalt:manganese was 55.0:25.0:20.0 and Li/Me was 1.03, and then thoroughly mixed together. The evaluation results are presented in Table 1.

Comparative Example 21

A positive electrode active material was obtained and evaluated in the same manner as in Example 2 except that the precursor particles obtained and lithium carbonate were weighed so that the molar ratio among nickel:cobalt:manganese was 60.0:20.0:20.0 and Li/Me was 1.03, and then thoroughly mixed together. The evaluation results are presented in Table 1. The XRD profile attained by the crystal structure evaluation is illustrated in FIG. 1.

Comparative Example 31

A positive electrode active material was obtained and evaluated in the same manner as in Example 1 except that the precursor particles obtained, lithium carbonate, and niobic acid ($Nb_2O_5 \cdot nH_2O$) having an average particle size of 1.0 μm were weighed so that the molar ratio among nickel:cobalt:manganese:niobium was 59.6:19.7:19.7:1.0 and Li/Me was 1.03 and then thoroughly mixed together and the lithium-niobium mixture was held at 820° C. for 10 hours in a stream for firing. The evaluation results are presented in Table 1.

Comparative Example 41

A positive electrode active material was obtained and evaluated in the same manner as in Example 1 except that the precursor particles obtained and lithium carbonate were weighed so that the molar ratio among nickel:cobalt:manganese was 80.0:10.0:10.0 and Li/Me was 1.03 and then thoroughly mixed together and the lithium-niobium mixture was held at 820° C. for 10 hours in a stream for firing. The evaluation results are presented in Table 1.

Comparative Example 51

A positive electrode active material was obtained and evaluated in the same manner as in Example 1 except that the precursor particles obtained, lithium carbonate, and niobic acid ($Nb_2O_5 \cdot nH_2O$) having an average particle size of 1.0 μm were weighed so that the molar ratio among nickel:cobalt:manganese:niobium was 79.6:9.7:9.7:1.0 and Li/Me was 1.03 and then thoroughly mixed together and the lithium-niobium mixture was held at 820° C. for 10 hours in a stream for firing. The evaluation results are presented in Table 1.

TABLE 1

| | Production conditions | | Positive electrode active material | | | | | | | Paste Presence or absence of gelation | Positive electrode active material | |
|---|---|---|---|---|---|---|---|---|---|---|---|---|---|
| | Amount of Nb added (at %) | Firing temperature ° C. | General formula (1) | | | | | Eluted Li (%) | Average particle size MV (μm) | Crystallite diameter of (003) plane (nm) | | Initial charge capacity (mAh/g) | Initial discharge capacity (mAg/g) |
| | | | Li d | Ni 1-a-b-c | Mn a | Co b | Nb c | | | | | | |
| Example 1 | 1 | 900 | 1.03 | 0.546 | 0.247 | 0.197 | 0.01 | 0.054 | 12.8 | 125.5 | ○ | 190 | 171.2 |
| Example 2 | 1 | 900 | 1.03 | 0.596 | 0.197 | 0.197 | 0.01 | 0.071 | 12.8 | 139 | ○ | 194.1 | 174.5 |
| Comparative Example 1 | 0 | 900 | 1.03 | 0.55 | 0.25 | 0.20 | 0 | 0.103 | 17.1 | 148.6 | x | 192.1 | 173.6 |
| Comparative Example 2 | 0 | 900 | 1.03 | 0.60 | 0.20 | 0.20 | 0 | 0.154 | 11.9 | 156.2 | x | 191.2 | 166.1 |
| Comparative Example 3 | 1 | 820 | 1.03 | 0.596 | 0.197 | 0.197 | 0.01 | 0.145 | 10.8 | 90.1 | x | 187.7 | 162.4 |
| Comparative Example 4 | 0 | 820 | 1.03 | 0.80 | 0.10 | 0.10 | 0 | 0.142 | 12.3 | 105.1 | x | 222.4 | 202.7 |
| Comparative Example 5 | 1 | 820 | 1.03 | 0.796 | 0.097 | 0.097 | 0.01 | 0.140 | 13.7 | 79.7 | x | 220.4 | 199.3 |

(Evaluation Results)

As presented in Table 1, in the positive electrode active materials of Examples 1 and 2, it has been indicated that the eluted Li amount is small and gelation of the positive electrode paste was suppressed at the time of positive electrode fabrication as compared with the positive electrode active materials of Comparative Examples 1 and 2 produced under the same conditions except that Nb is not added.

FIG. 5 is a diagram illustrating the XRD profiles in Examples and Comparative Examples. As illustrated in FIG. 5, in the positive electrode active materials of Examples 1 and 2, a peak attributed to the lithium-niobium compound has been confirmed as a heterogenous phase (in FIG. 1, ▼ is the peak corresponding to the heterogenous phase). On the other hand, in the positive electrode active material of Comparative Example 1, a peak attributed to the lithium-niobium compound has not been confirmed.

In the positive electrode active materials of Examples, it is presumed that the amount of excessive lithium such as unreacted lithium carbonate after firing and the eluted Li amount are decreased by the generation of a lithium-niobium compound. Hence, the formation of a lithium-niobium compound is effective in the suppression of gelation.

It has been indicated that the positive electrode active material of Example 2 having a Ni content of 0.55 or more in the general formula (1) has a higher charge and discharge capacity while suppressing gelation of the positive electrode paste as compared with the positive electrode active material of Comparative Example 2 having a similar composition except that it does not contain Nb.

The positive electrode active material of Comparative Example 3 was produced under the same conditions as in Example 2 except the firing temperature but the reaction between niobic acid and excessive lithium did not favorably proceed and the eluted Li amount was not decreased since the firing conditions (firing temperature: less than 850° C.) were not proper.

The positive electrode active materials of Comparative Examples 4 and 5 were produced under the same conditions except that Nb was not added in Comparative Example 4 and Nb was added in Comparative Example 5, but the eluted Li amount was not decreased regardless of the addition of Nb since the firing conditions (firing temperature: less than 850° C.) were not proper.

INDUSTRIAL APPLICABILITY

In the present embodiment, a positive electrode active material for non-aqueous electrolyte secondary battery that achieves high capacity, durability, and thermal stability at the same time can be obtained by an industrial production method. This non-aqueous electrolyte secondary battery can be suitably used as a power source for small portable electronic devices (such as notebook personal computers and mobile phone terminals) that are always required to have a high capacity and a long service time.

The secondary battery of the present embodiment is superior in safety and further superior in capacity and durability to a battery fabricated using a conventional positive electrode active material of a lithium-cobalt-based oxide or lithium-nickel-based oxide. Hence, the secondary battery can be suitably used as a power source for electric cars that are restricted in mounting space since microminiaturization and increased service time thereof are possible.

The positive electrode active material of the present embodiment and the secondary battery fabricated using the same can be used not only as a power source for electric cars driven purely by electric energy but also as a power source and a stationary storage battery for so-called hybrid cars used together with a combustion engine such as a gasoline engine or a diesel engine.

Note that the technical scope of the present invention is not limited to the aspects described in the embodiments and the like. One or more of the requirements described in the embodiments and the like may be omitted. In addition, the requirements described in the embodiments and the like can be combined as appropriate.

REFERENCE SIGNS LIST

CBA Coin-type battery
PE Positive electrode (electrode for evaluation)
NE Negative electrode
SE Separator
GA Gasket
WW Wave washer
PC Positive electrode can
NC Negative electrode can

The invention claimed is:

1. A positive electrode active material for non-aqueous electrolyte secondary battery comprising a lithium-nickel-manganese composite oxide formed of secondary particles with a plurality of aggregated primary particles, wherein
the positive electrode active material is represented by a general formula (1): $Li_dNi_{1-a-b-c}Mn_aM_bNb_cO_{2+\alpha}$ [where M is at least one element selected from the group consisting of Co, W, Mo, V, Mg, Ca, Al, Ti, Cr, Zr and Ta, $0.05 \le a \le 0.6$, $0 \le b \le 0.6$, $0.0003 \le c \le 0.03$, $0.95 \le d \le 1.2$, $0.33 < (1-a-b-c)$, and $0 \le \alpha \le 0.4$],
at least a part of niobium is solid-dissolved inside the primary particles, and
an amount of lithium to be eluted into water when the positive electrode active material is immersed in water is 0.02% by mass or more and 0.10% by mass or less with respect to entire positive electrode active material as determined by a neutralization titration method.

2. The positive electrode active material for non-aqueous electrolyte secondary battery according to claim 1, wherein a maximum niobium concentration inside the primary particles is 1 time or more and 3 times or less an average niobium concentration inside the primary particles.

3. The positive electrode active material for non-aqueous electrolyte secondary battery according to claim 1, wherein
the positive electrode active material comprises a compound containing lithium and niobium, and
the compound containing lithium and niobium exists on a surface of the primary particles.

4. The positive electrode active material for non-aqueous electrolyte secondary battery according to claim 1, wherein a crystallite diameter of the positive electrode active material is 110 nm or more and 200 nm or less as determined from a peak of (003) plane in an X-ray diffraction pattern by Scherrer equation.

5. The positive electrode active material for non-aqueous electrolyte secondary battery according to claim 1, wherein a volume average particle size MV of the positive electrode active material is 5 µm or more and 20 µm or less.

6. A method for producing the positive electrode active material for non-aqueous electrolyte secondary battery containing a lithium-nickel-manganese composite oxide formed of secondary particles with a plurality of aggregated primary particles according to claim 1, the method comprising:

mixing at least either of nickel-manganese composite hydroxide particles or nickel-manganese composite oxide particles with a niobium compound and a lithium compound; and firing the lithium-niobium mixture obtained by mixing, thereby producing the positive electrode active material according to claim 1, wherein the nickel-manganese composite hydroxide particles and the nickel-manganese composite oxide particles contain nickel, manganese, and optionally an element M, wherein an atomic ratio of the respective metals is represented by Ni : Mn : M=(1−a−b) : a : b [where $0.05<a<0.6$, $0<b<0.6$, $0.33<(1-a-b)$, M is at least one element selected from the group consisting of Co, W, Mo, V, Mg, Ca, Al, Ti, Cr, Zr and Ta], the lithium-niobium mixture contains niobium at 0.03 atomic% or more and 3 atomic% or less with respect to entire metal elements other than lithium, and the positive electrode active material is adjusted so that at least a part of niobium is solid-dissolved inside the primary particles and an amount of lithium to be eluted into water when the positive electrode active material is immersed in water is 0.02% by mass or more and 0.10% by mass or less with respect to entire positive electrode active material as determined by a neutralization titration method.

7. The method according to claim 6, wherein the lithium-niobium mixture is fired at 850° C. or more and 1000° C. or less in an oxidizing atmosphere.

8. The method according to claim 6, wherein a maximum niobium concentration is 1 time or more and 3 times or less an average niobium concentration inside the primary particles.

9. The method according to claim 6, wherein the firing is performed so that a crystallite diameter of the positive electrode active material is 110 nm or more and 200 nm or less as determined from a peak of (003) plane in an X-ray diffraction pattern by Scherrer equation.

10. The method according to claim 6, wherein the nickel-manganese composite hydroxide particles are obtained by performing crystallization in a reaction aqueous solution containing a salt containing nickel, a salt containing manganese, and optionally a salt containing an element M by controlling a pH of and an ammonium ion concentration in the reaction aqueous solution to be in predetermined ranges, and the nickel-manganese composite oxide particles are obtained by subjecting the nickel-manganese composite hydroxide particles obtained by the crystallization to a thermal treatment.

11. The method according to claim 6, wherein the niobium compound is niobic acid or niobium oxide and has an average particle size of 0.01 om or more and 10 μm or less.

12. The method according to claim 6, wherein the lithium compound is lithium carbonate.

13. The method according to claim 6, wherein the nickel-manganese composite oxide particles are obtained by subjecting the nickel-manganese composite hydroxide particles to a thermal treatment at a temperature of 105° C. or more and 700° C. or less.

14. A method for evaluating the positive electrode active material for non-aqueous electrolyte secondary battery according to claim 1, the positive electrode active material containing a lithium-nickel-manganese composite oxide represented by a general formula (1): $Li_dNi_{1-a-b-c}M_aM_bNb_cO_{2+\alpha}$ [where M is at least one element selected from the group consisting of Co, W, Mo, V, Mg, Ca, Al, Ti, Cr, Zr and Ta, $0.05<a<0.6$, $0<b<0.6$, $0.0003<c<0.03$, $0.95<d<1.2$, $0.33<(1-a-b-c)$, and $0<\alpha<0.4$], the method comprising:

measuring an amount of lithium that is eluted into water when the positive electrode active material is immersed in water and determined by a neutralization titration method; and selecting a positive electrode active material in which the amount of lithium eluted into water is 0.02% by mass or more and 0.10% by mass or less with respect to entire positive electrode active material.

15. A non-aqueous electrolyte secondary battery comprising a positive electrode, a negative electrode, and a non-aqueous electrolyte, wherein the positive electrode contains the positive electrode active material for non-aqueous electrolyte secondary battery according to claim 1.

* * * * *